United States Patent [19]

Kasahara

[11] Patent Number: 5,140,471
[45] Date of Patent: Aug. 18, 1992

[54] APPARATUS FOR DRIVING OBJECTIVE LENS

[75] Inventor: Akihiro Kasahara, Kawasaki, Japan

[73] Assignee: Kabushiki Kaisha Toshiba, Kawasaki, Japan

[21] Appl. No.: 477,438

[22] Filed: Feb. 9, 1990

[30] Foreign Application Priority Data

| Feb. 10, 1989 | [JP] | Japan | 1-29608 |
| Apr. 3, 1989 | [JP] | Japan | 1-81403 |
| Apr. 3, 1989 | [JP] | Japan | 1-81421 |
| Apr. 3, 1989 | [JP] | Japan | 1-81422 |
| Apr. 3, 1989 | [JP] | Japan | 1-81423 |
| Jun. 1, 1989 | [JP] | Japan | 1-137462 |
| Jun. 13, 1989 | [JP] | Japan | 1-148450 |
| Nov. 9, 1989 | [JP] | Japan | 1-290067 |
| Nov. 9, 1989 | [JP] | Japan | 1-290068 |

[51] Int. Cl.$^5$ .......................... G02B 7/02; G11B 7/00
[52] U.S. Cl. ................................ 359/824; 359/823; 369/44.14
[58] Field of Search ............... 350/247, 252, 255, 257; 359/819-827; 369/44.11-44.34

[56] References Cited

U.S. PATENT DOCUMENTS

| 4,607,913 | 8/1986 | Jansen | 350/247 |
| 4,761,774 | 8/1988 | Ishibashi et al. | 369/44.19 |
| 4,792,935 | 12/1988 | Kime et al. | 369/44.22 |
| 4,927,235 | 5/1990 | Naruai | 350/255 |
| 4,939,711 | 7/1990 | Yoda | 369/44.11 |
| 4,945,528 | 7/1990 | Jansen et al. | 369/44.11 |

FOREIGN PATENT DOCUMENTS

| 273367 | 7/1988 | European Pat. Off. | 350/245 |
| 3634788 | 4/1987 | Fed. Rep. of Germany . | |
| 58-30968 | 2/1983 | Japan . | |
| 59-178630 | 10/1984 | Japan . | |
| 61-123030 | 6/1986 | Japan . | |
| 62-40627 | 2/1987 | Japan . | |
| 1178143 | 7/1989 | Japan | 369/44.21 |

OTHER PUBLICATIONS

Patent Abstracts of Japan, Oct. 23, 1986, vol. 10, No. 312 p. 69 P 509.
Patent Abstracts of Japan, May 2, 1987, vol. 11, No. 137 p. 92 D 572.

Primary Examiner—Bruce Y. Arnold
Assistant Examiner—Thong Nguyen
Attorney, Agent, or Firm—Oblon, Spivak, McClelland, Maier & Neustadt

[57] ABSTRACT

In an apparatus for moving an objective lens, the objective lens is fitted in a cylindrical lens holder. A focusing coil is fixed in the holder and the holder is suspended by one ends of a pair of leaf springs which is symmetrically arranged in respect to a reference line. The other end of the leaf springs is fixed on a rotary body which is rotatably supported on a base, includes a cup section and a triangular section integrally formed with the cup section and is formed into a symmetrical shape about the reference line. A focusing magnetic circuit in which the focusing coil is located, is mounted on the triangular section and a pair of radial coils are fixed to the side surface of the cup section. A pair of radial magnetic circuits, each including yokes and permanent magnets, are located at both side of the rotary body and the radial coils are so mounted around the corresponding yokes, respectively that the coils slides along the corresponding yokes, respectively. The lens holder is moved along the optical axis of the objective lens when the focusing coil is energized and is moved in a radial direction normal to the optical axis when the radial coils are energized.

95 Claims, 22 Drawing Sheets

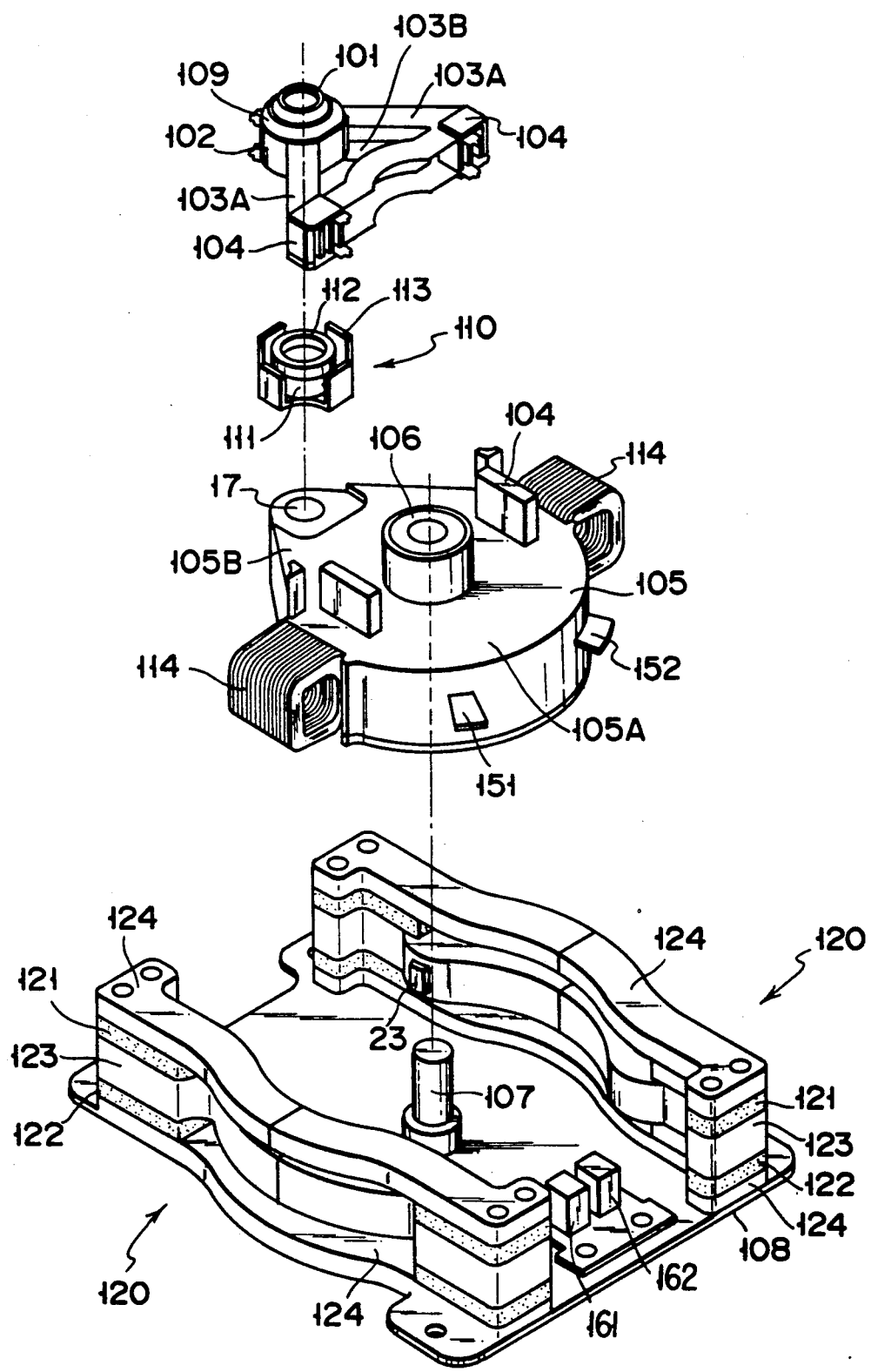
F I G. 2

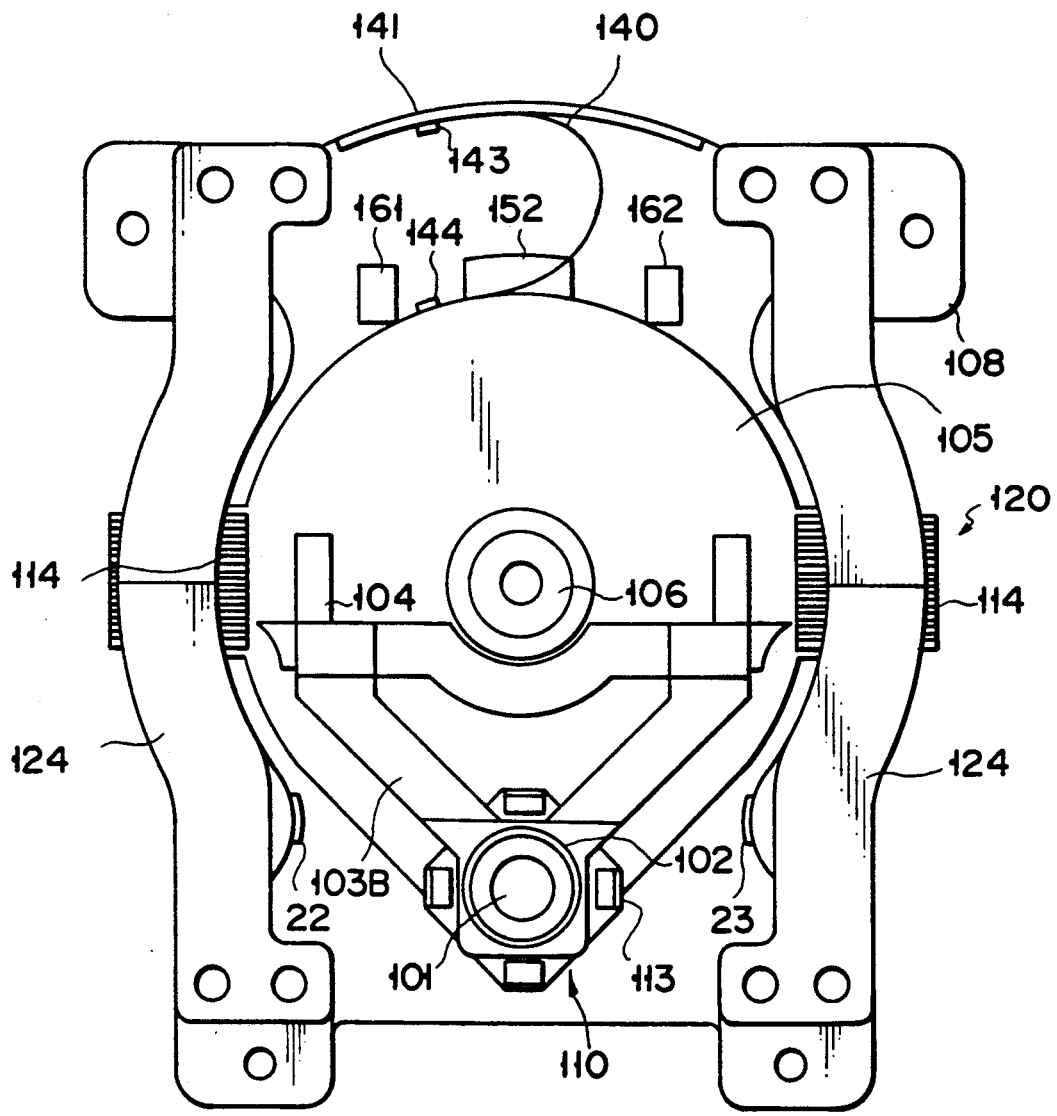
F I G. 3

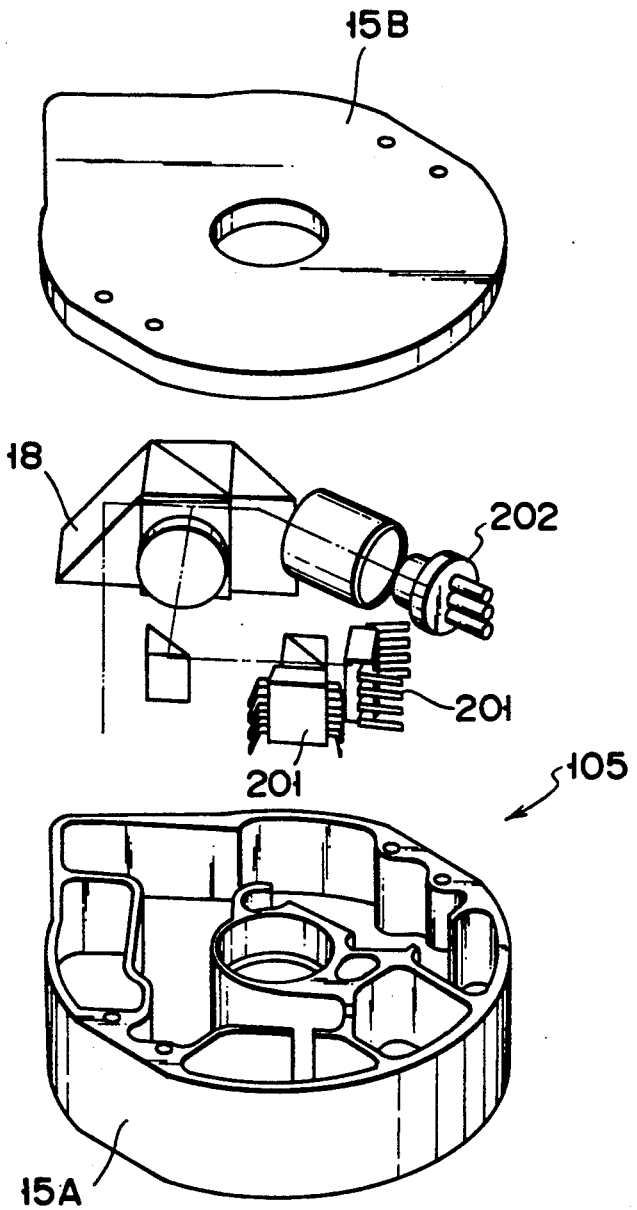
F I G. 7A

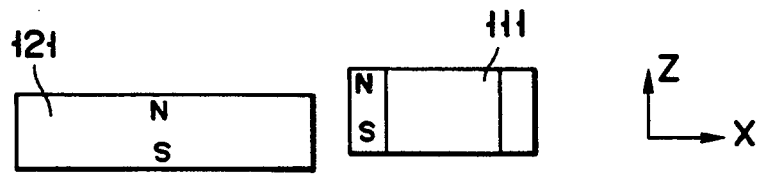
F I G. 12A
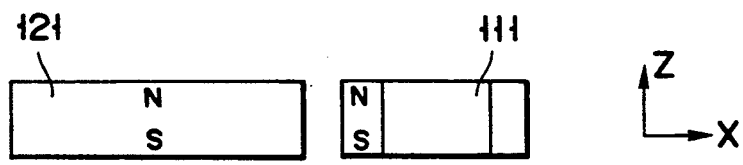
F I G. 12B
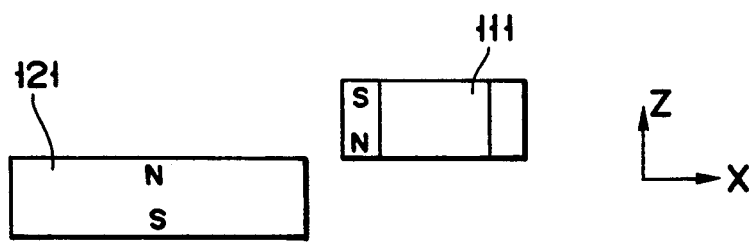
F I G. 12C

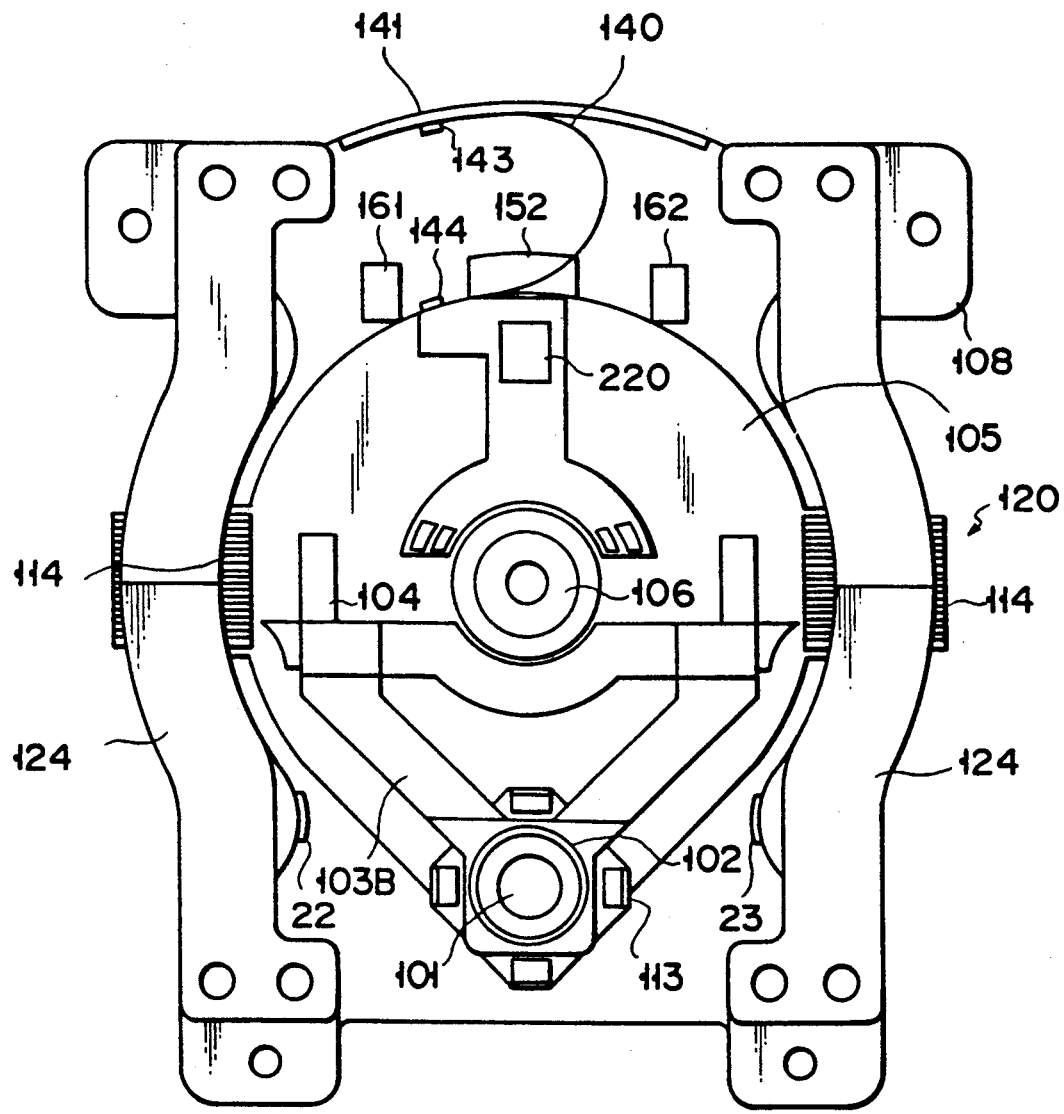
F I G. 25

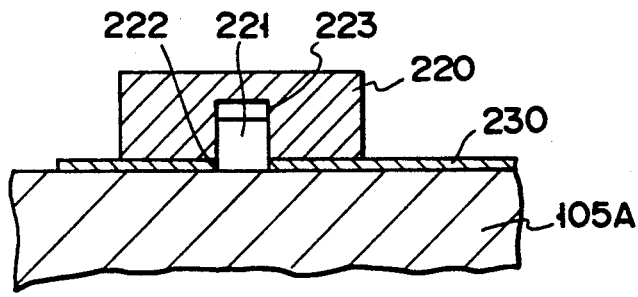
F I G. 26
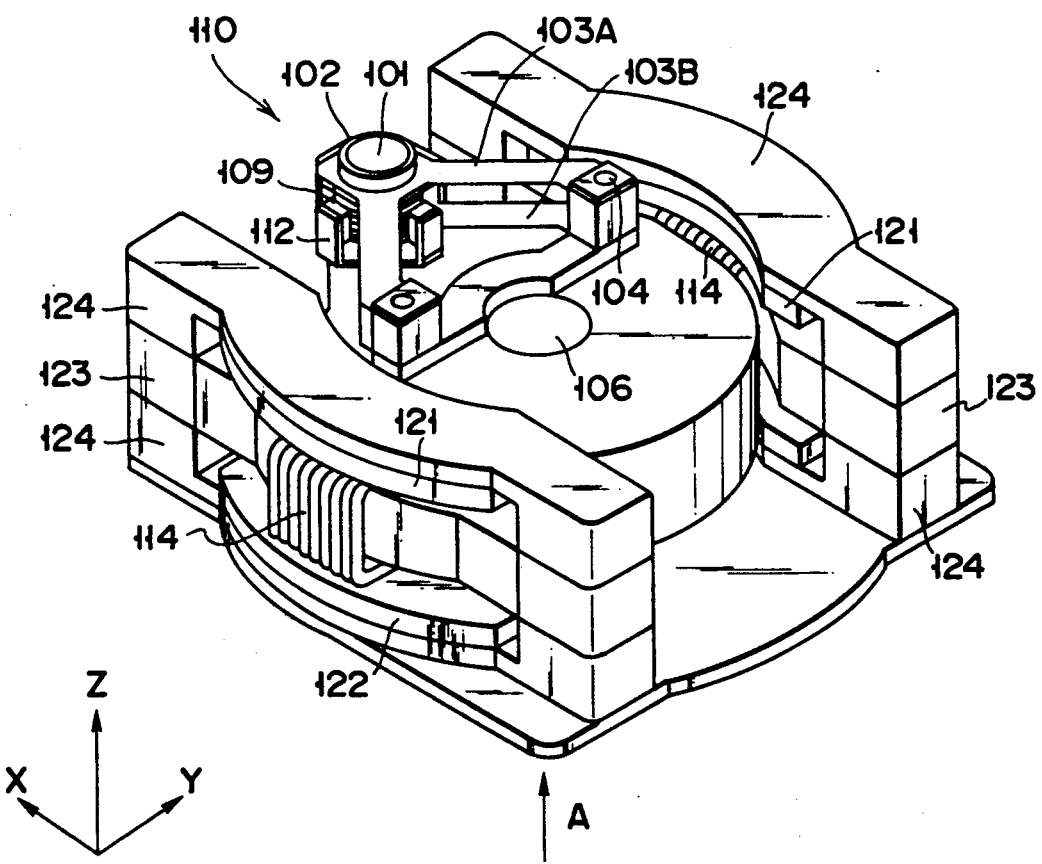
F I G. 27

APPARATUS FOR DRIVING OBJECTIVE LENS

BACKGROUND OF THE INVENTION

1. Field of the Invention

The present invention relates to an apparatus for driving an objective lens and, more particularly, to an actuator apparatus for moving an objective lens along a direction crossing a tracking guide of an optical disk.

2. Description of the Related Art

In a system for optically recording information on an optical information recording medium such as an optical disk or an opto-magnetic disk and reproducing the information from the recording medium, i.e., an optical disk system, focus servo is operated to maintain an object lens in a focusing state, a light beam is focused on an optical disk by an objective lens, and a desired tracking guide on the optical disk is accessed. In addition, tracking servo is operated to maintain the objective lens in a tracking state, and a desired track, i.e., a tracking guide or an array of tracking guides is traced by a light beam. In a state wherein the objective lens is maintained in the focusing and tracking states, a light beam is intensity-modulated to record information on the optical disk, and light which is reflected by the optical disk and returns through the objective lens is detected to reproduce information.

The optical disk system described above comprises an optical head apparatus comprising a mechanism for moving the objective lens along its optical axis, i.e., a focus direction, and along a direction perpendicular to the optical axis, i.e., a direction crossing the tracking guide so as to attain focus servo and tracking servo. The optical head apparatus is classified into a linear type apparatus for linearly moving the objective lens along a direction perpendicular to the optical axis and a rotary type apparatus for arcuately moving the objective lens along a radial direction crossing the tracking guide. The linear and rotary type apparatuses have both merits and demerits, and it cannot be determined which type is preferable. An optical head apparatus of either type is required to achieve access of the tracking guide and the tracking servo operation by the same mechanism in order to simplify a mechanism of an apparatus and to attain high-speed, high-precision access and tracking servo.

In the optical head apparatus, a lens holder for holding the objective lens using a magnetic circuit is moved in the radial and focus directions of a disk. Upon movement of the objective lens, especially, upon access of the tracking guide, a moving position of a moving body carrying the lens holder of the objective lens, i.e., the position of the objective lens in the radial direction of the optical disk must be detected. In a conventional position detection device for detecting the moving position of the objective lens, a shutter member is provided to the moving body, and is detected by detection elements such as two photointerrupters provided to a stationary base unit, thereby detecting whether or not the objective lens is located at an end of a moving range of the moving body. However, in the conventional position detection device, a detection element for detecting the shutter member when the objective lens is located at the innermost end, and a detection element for detecting the shutter member when the objective lens is located at the outermost end must be arranged adjacent to the moving body. In this apparatus, since the two detection elements are arranged to have a large gap therebetween, an optical head becomes bulky. Although the conventional position detection device can detect that the objective lens is located at the innermost or outermost end, it cannot detect whether the objective lens is located near the innermost or outermost end. Therefore, it is difficult to accurately position the objective lens at the innermost or outermost end as a home position.

In this manner, in the conventional position detection device, since a large distance between the two detection elements must be set, a device such as an optical head becomes bulky, and it cannot be detected whether or not the position of the moving body is near the end of its moving range. Therefore, it is difficult to accurately position the moving body at the end of its moving range.

The rotary type optical head apparatus is disclosed in, e.g., Published Unexamined Japanese Patent Application No. 61-123030. In the conventional rotary type optical head apparatus, a focusing magnetic circuit for generating a driving force for driving the objective lens in a focus direction and a radial magnetic circuit for generating a driving force for driving the objective lens in a radial direction are arranged in a stationary unit. In the conventional rotary type optical head apparatus, upon radial movement of the objective lens, a focusing coil must be arranged to be movable in a radial direction in the focusing magnetic circuit. For this purpose, the focusing magnetic circuit is formed to extend in the radial direction. As a result, the entire optical head becomes large in size, and since a ratio of magnetic fluxes effectively used to interlink with those of the focusing coil to magnetic fluxes generated by the focusing magnetic circuit is small, a driving force for moving the objective lens in the focus direction cannot consequently be increased. In this manner, in the conventional rotary type optical head apparatus, since the focusing magnetic circuit must be formed to extend in the radial direction, the entire optical head becomes bulky, and a ratio of magnetic fluxes effectively used of those generated by the focusing magnetic circuit is small, and a driving force for moving the objective lens along the optical axis cannot be increased.

The conventional rotary type magnetic disk apparatus is required to increase a driving force of a driving unit to attain high-speed positioning. As is generally known, in order to obtain a large driving force, a current to be flowed through a coil in the driving unit is increased to increase a Lorentz force to be generated. This method, however, requires a large driving current, resulting in an increase in power consumption. An increase in current inevitably causes an increase in heat generated from a coil, and a temperature inside the apparatus is increased. Thus, a problem of an influence of heat to other components must also be taken into consideration.

In the rotary type optical head apparatus, there is proposed a structure in which a focusing unit for supporting the objective lens to be movable along an optical axis is fixed to the outermost periphery of a rotary body which is rotated about an axis parallel to the optical axis. In general, when an almost disk-like substance is floating in a free space, it has an almost arcuated vibration mode, and the amplitudes of vibration become maximum at outermost and innermost peripheral positions. Even when a rotary body is supported by a ball bearing or the like, vibration in a specific vibration mode appears in a small apparatus such as an optical head apparatus in a frequency range of 1 kHz or higher, its vibration amplitude is almost equal to or smaller than that of a play of the bearing, and its vibration mode is substantially the same as that in a state wherein the rotary body is floating in a free space. For this reason, in an apparatus having a structure in which the focusing unit is fixed at the outermost peripheral portion, the focusing unit is largely influenced by vibration of the rotary body in a specific mode, and a highly precise control operation cannot be realized. In order to avoid the influence of vibration, the mechanical strength of the rotary body may be increased. However, a method to achieve this suffers from limitations, and a servo range required in a recording or reproduction optical head apparatus cannot be obtained.

In the conventional optical head apparatus, a base to which an optical system is fixed is formed by a aluminum die-cast to precisely mount optical components. However, in a rotary drum in which an optical system is assembled with an aluminum die-cast base, a laser diode or photodetector in the apparatus is heated by heat generated by a tracking coil, resulting in a short service life of the laser diode, and an increase in noise level of a laser beam generated from the laser diode.

SUMMARY OF THE INVENTION

It is an object of the present invention to provide an apparatus for driving an objective lens, which has a simple structure and can access a tracking guide with high precision.

It is another object of the present invention to provide a rotary type optical head apparatus which can make a focusing magnetic circuit compact, and can increase a driving force when an objective lens is moved along an optical axis.

It is still another object of the present invention to provide an optical head apparatus comprising a compact position detection device which can relatively accurately detect the position of a moving body for moving an objective lens.

It is still another object of the present invention to provide an optical head apparatus which can generate a large driving force without increasing power consumption, and can achieve high-speed positioning.

It is still another object of the present invention to provide an optical head apparatus which can sufficiently obtain a servo range required in a high-density recording or reproduction optical head apparatus.

According to the invention, there is provided an apparatus capable of moving an objective lens for focusing a light beam along an optical axis thereof, and moving said objective lens along a direction perpendicular to the optical axis, comprising:

a holding member for holding said objective lens;

first magnetic field generating means, provided to said holding member, for generating a first magnetic field;

at least a pair of leaf springs, each having one end coupled to said holding member, for supporting said holding member to be movable along the optical axis of said objective lens;

a rotary body having a rotational axis at a center thereof, axially supported to be rotatable about the rotational axis, and including a substantially cylindrical first section to which the other end of each of said pair of leaf springs is fixed symmetrically about a first direction substantially perpendicular to the rotational axis, and a substantially triangular second section projecting from said first section in the first direction, said first and second sections constituting an integrated structure and having a symmetrical shape about the first direction;

second magnetic field generating means, arranged on said second section of said rotary body, for generating a second magnetic field which interacts with the first magnetic field generated by said first magnetic field generating means to generate a driving force for moving said holding member along the optical axis of said objective lens;

third magnetic field generating means, arranged on said second section of said rotary body, for generating a third magnetic field; and fourth magnetic field generating means, arranged adjacent to said third magnetic field generating means, for generating a rotational force for rotating said rotary body about the rotational axis by an interaction with the third magnetic field generated by said third magnetic field generating means.

According to the invention, there is also provided an apparatus for detecting movement of a moving body moved within a range between first and second positions, comprising:

first and second members moved in a moving path together with said moving body, and arranged along said moving path to have a first gap therebetween;

first and second detection units, arranged in said moving path to have a second gap therebetween, for detecting movement of said first and second members to generate first and second detection signals, respectively, when said moving body is moved to a first position, said first member being detected by said first and second detection units, and when said moving body is moved to a second position, said second member being detected by said second detection unit; and signal processing means for processing the first and second detection signals from said first and second detection units to generate a position signal corresponding to a moving position of said rotary member.

According to the invention, there is also provided a rotary actuator comprising:

first magnetic field generating mean for generating a first magnetic field;

second magnetic field generating means for generating a second magnetic field which interacts with the first magnetic field to generate a rotational force; and a rotary body, to which said second magnetic field generating means is fixed, has a rotational axis at a center thereof, is axially supported to be rotatable about the rotational axis, and is rotated by the generated rotational force, said rotary body having a moment of inertia about the central axis, which is equal to a moment of inertia about a central axis of said second magnetic field generating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is an exploded perspective view of the optical head apparatus shown in FIG. 1;

FIG. 3 is a plan view of an optical head shown in FIG. 1;

FIG. 7a is in exploded respective view showing a structure of a rotary drum shown in FIG. 1;

FIGS. 12A to 12C show positional relationships among permanent magnets in a radial magnetic circuit and a focusing magnetic circuit shown in FIG. 11;

FIG. 25 is a plan view showing a modification of the optical head apparatus shown in FIG. 1;

FIG. 26 is a partial sectional view showing a fixing structure of a preamplifier shown in FIG. 25; and FIG. 27 is a side view showing another embodiment of an optical head apparatus according to the present invention.

DETAILED DESCRIPTION OF THE PREFERRED EMBODIMENTS

An embodiment of the present invention will be described below with reference to the accompanying drawings.

Figure 1:
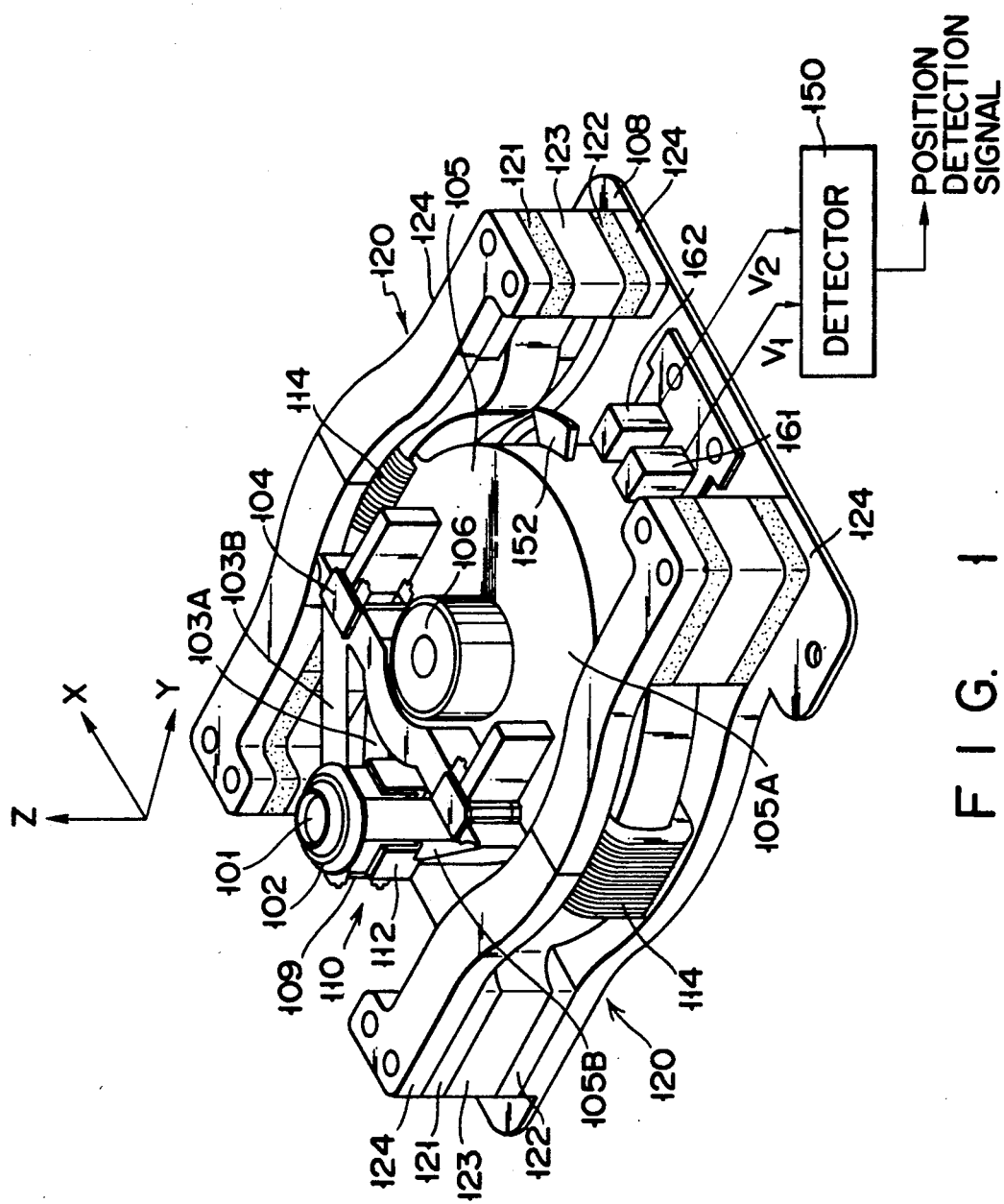
FIG. 1 is a perspective view showing a rotary type optical head apparatus according to an embodiment of the present invention.
Figure 4:
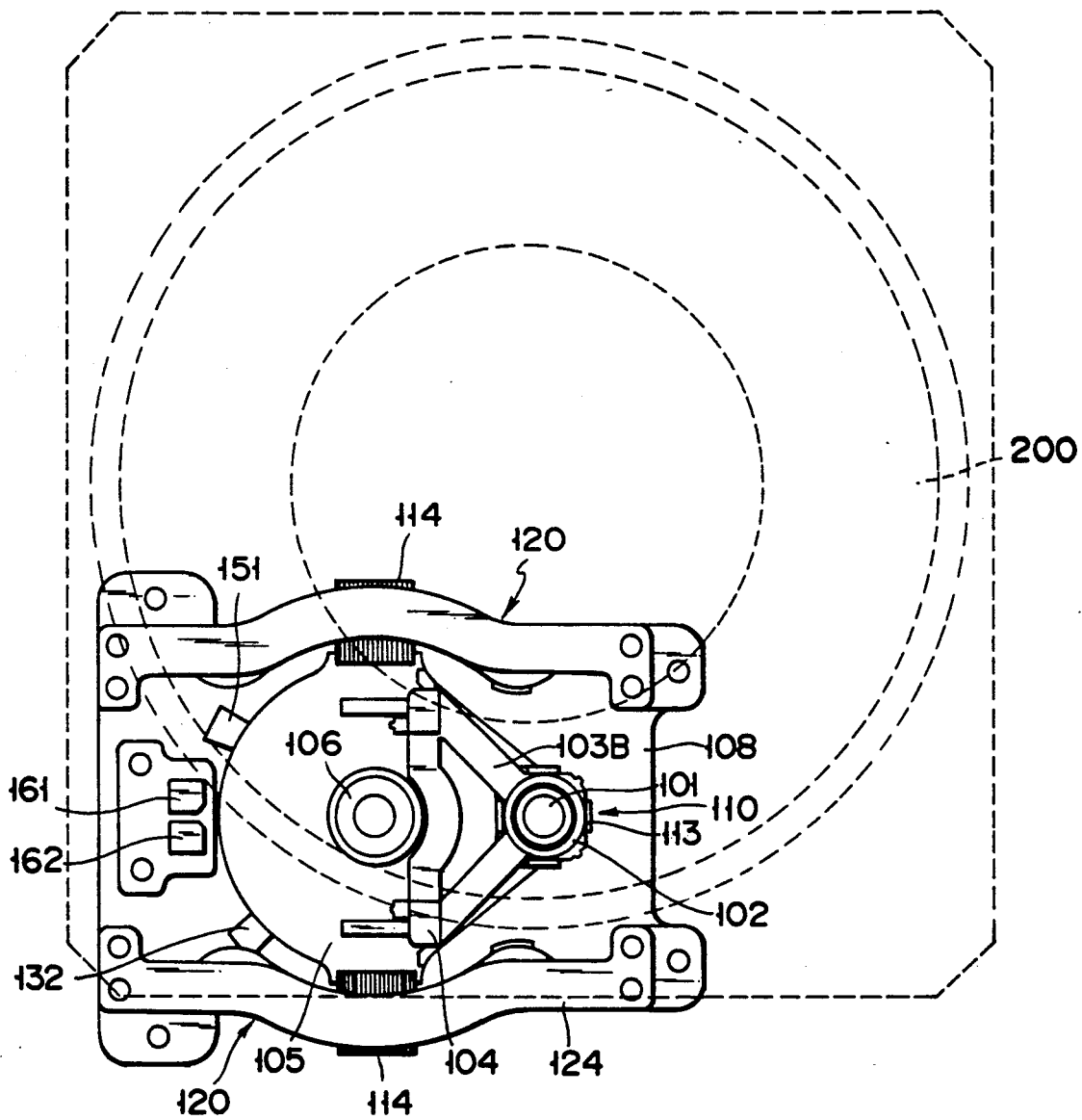
FIG. 4 is another plan view of an optical head apparatus shown in FIG. 1.

FIG. 1 is a perspective view showing a rotary type optical head apparatus according to an embodiment of the present invention, FIG. 2 is an exploded perspective view of the rotary type optical head apparatus shown in FIG. 1, and FIGS. 3 and 4 are plan views of the rotary type optical head apparatus shown in FIG. 1.

As shown in FIGS. 1 and 2, an objective lens 101 for focusing a light beam generated from a semiconductor laser (not shown) is held by a lens holder 102. The lens holder 102 is fixed to one-end portions of two, upper and lower leaf springs 103A and 103B which are arranged to form isosceles triangles When the upper and lower leaf springs 103A and 103B are deformed in an optical axis direction Z of the objective lens 101, i.e., in a focus direction to be substantially parallel to each other, the objective lens is moved in the focus direction. The leaf springs 103A and 103B are secured via leaf fixing members 104. The leaf spring 103A and 103B and fixing members 104 are secured to rotary drum 105 at predetermined positions corresponding to a node of a vibration mode of a rotary body defined in consideration of a vibration model. The rotary body shown in FIG. 5 which includes the rotary drum 105 and radial coils 114 is vibrated based on a vibration model shown in FIG. 6. In FIG. 6, assuming that a length connecting an end of the radial coil 114 corresponding to the outermost periphery of the rotary body and the rotational center is represented by L, a region H on the rotary drum 105 surrounded by a circle Cp having a radius R1 ¼ of the length L and a circle Cq having a radius R2 ¾ of the length L corresponds to the node of the vibration mode of the rotary body, as can be seen from FIG. 6. The leaf spring fixing members 104 are arranged in this region H, and within this region H, a focusing unit including the leaf springs 103A and 103B is fixed to the rotary drum 105 by the fixing members 104.

Figure 5:
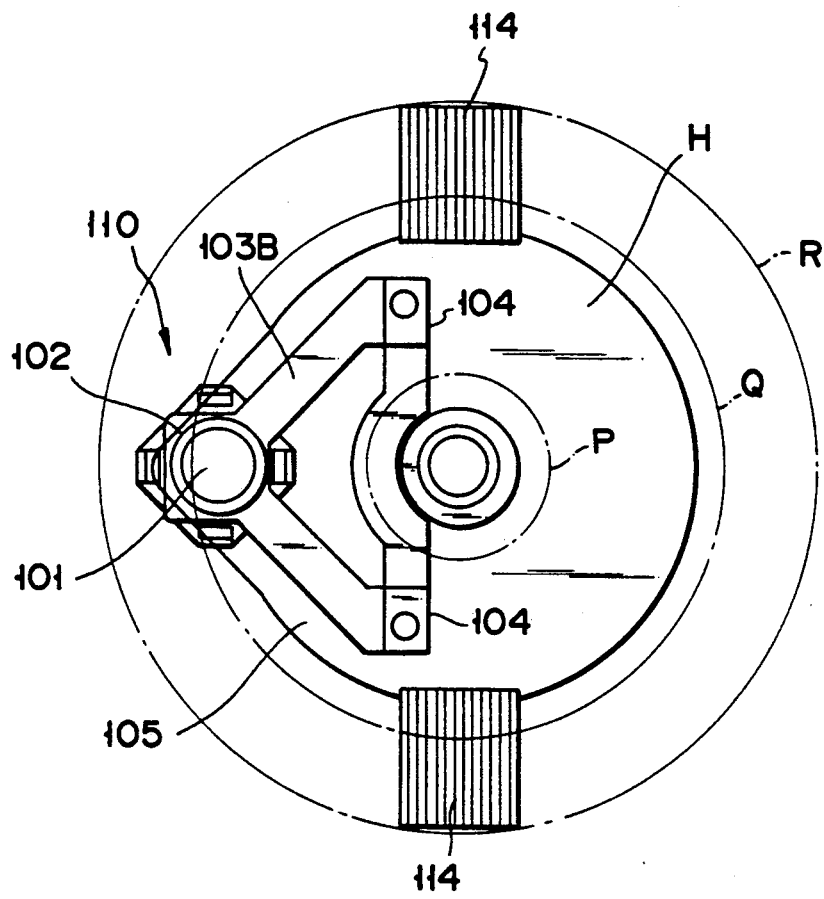
FIG. 5 is a plan view showing a rotary body of the optical head apparatus shown in FIG. 1.
Figure 6:
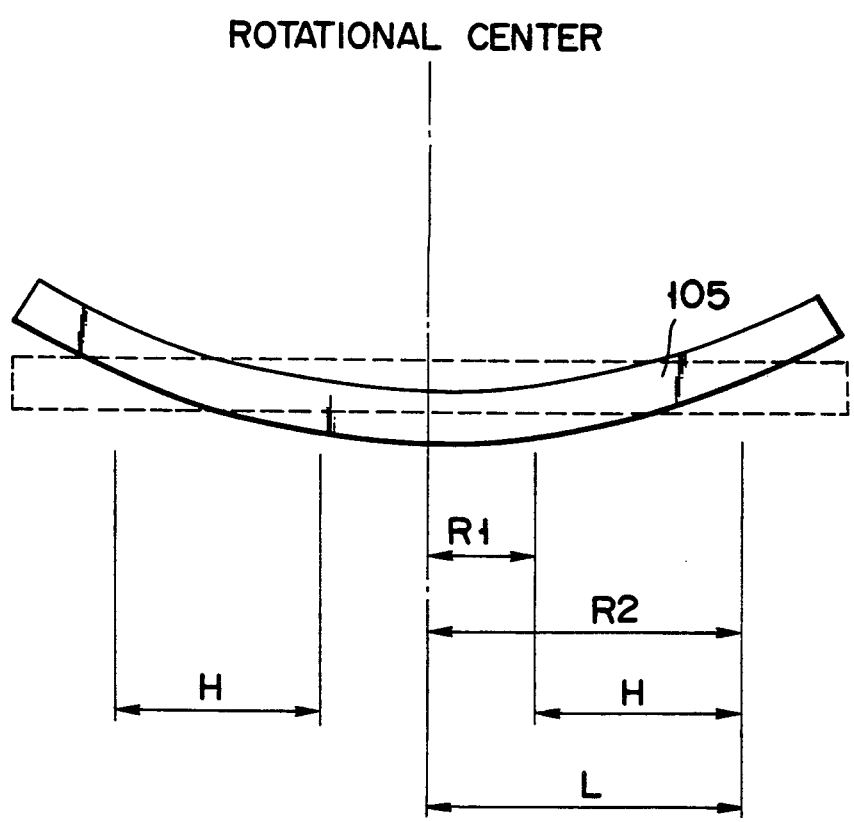
FIG. 6 is a schematic view showing a vibration model of the rotary body shown in FIG. 5.

As shown in FIG. 5, even when the rotary body is vibrated, since the focusing unit is fixed at a position corresponding to the node of the vibration mode of the rotary body where a displacement is minimum, vibration of the rotary body is not transmitted to the focusing unit, and the objective lens is not easily abnormally vibrated. Thus, even if a high servo range is set, oscillation can be prevented, and high-precision control necessary for high-density recording or reproduction can be realized. More specifically, a servo range required in high-density recording or reproduction can be given to an optical head.

As can be understood from FIGS. 2, 3, and 4, the rotary drum 105 has an almost teardrop-like shape when it is viewed from the top, and consists of a circular section 105A obtained by removing a portion of a disk, and a substantially isosceles-triangular section 105B extending from the removed portion of the circular section 105A. The rotary drum 105 is rotatably supported on a shaft 107 through a bearing 106 arranged at its center. The base end portion of the shaft 107 is fixed to a stationary base 108 by insertion under pressure or by an adhesive. Note that the lens holder 102 is arranged above the distal end portion of the substantially isosceles-triangular section 105B to be offset from the shaft 107 as the rotational center of the rotary drum 105.

Figure 7B:
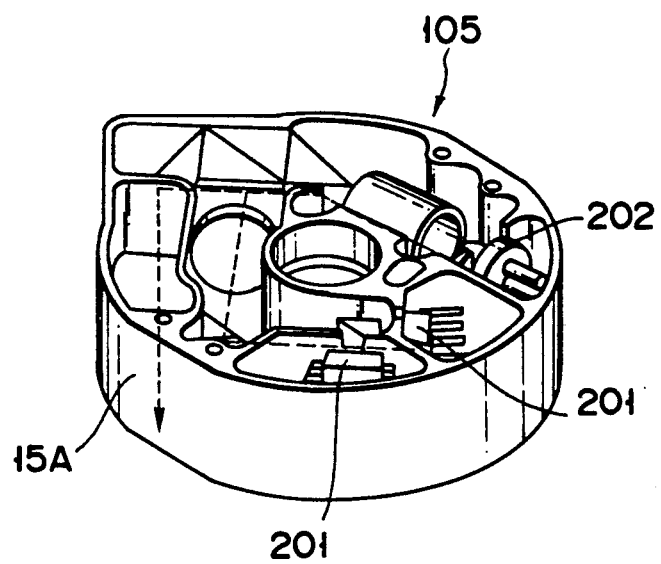
FIG. 7b is a perspective view showing internal structure of a rotary drum shown in FIG. 1.
Figure 8A:
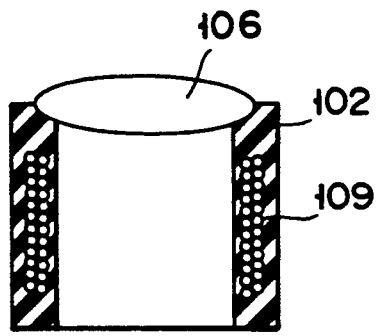
FIG. 8a is a sectional view showing an example of a lens holder shown in FIG. 1.

As shown in FIG. 7A, the rotary drum 105 is integrally constituted by a rotary drum upper lid 15A formed of a ceramic having a high mechanical strength, and a rotary drum lower lid 15B formed of aluminum by an adhesive or a screw and an adhesive. As shown in FIG. 7B, some of optical components including a laser diode 202 for generating a light beam toward an optical disk 200, a photodetector 201 for detecting a light beam reflected by the optical disk 200, and the like are housed in and fixed to the upper lid 15A of the rotary drum 105. The upper lid 15A is closed by the lower lid 15B. A hole 17 through which a light beam passes is formed in a portion of the lower lid 15B corresponding to the triangular section 105B, as shown in FIG. 2. The hole 17 is closed by a prism 18 for deflecting an optical path of an optical system. Therefore, the interior of the rotary drum 105 is maintained in a state free from external dust or the like. As shown in FIG. 8A, a focusing coil 109 whose central axis coincides with the optical axis of the objective lens 101 is embedded in the lens holder 102 formed by plastic molding. The lens holder 102 with the structure shown in FIG. 8A is formed in such a manner that the focusing coil 109 is placed in molds for molding this lens holder 102, and a plastic is filled in the molds.

Figure 8B:
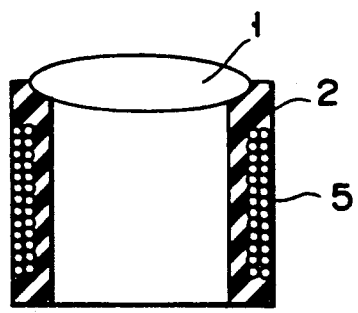
FIG. 8b is a sectional view showing another example of a lens holder shown in FIG. 1.
Figure 8C:
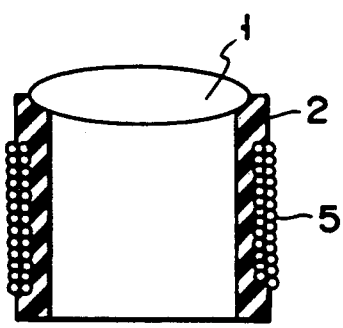
FIG. 8c is a sectional view showing still another example of a lens holder shown in FIG. 1.

According to the lens holder 102 shown in FIG. 8A, even if a relatively large focusing current is supplied to the focusing coil 109 to obtain a large driving force and the focusing coil 109 is heated, a self-welded layer for tightly holding wires constituting the coil and insulating them from each other can be prevented from being evaporated due to heat and scattered outside the lens holder 102. The objective lens 101 can be prevented from being contaminated with particles of a welding agent evaporated from the focusing coil 109, and initial characteristics of the objective lens 101 can be maintained. The focusing coil 109 need not always be completely embedded in the lens holder 102. As shown in FIG. 8B or 8C, the focusing coil 109 may be exposed from the outer surface of the lens holder 102. In this lens holder 102, even if welding agent particles are evaporated from the focusing coil 109, they are scattered not toward the objective lens 101 but outwardly. Thus, the objective lens 101 can be prevented from being contaminated. In the structures shown in FIGS. 8B and 8C, since the focusing coil 109 is directly exposed to the outside, it can be effectively cooled without causing heat trap inside the lens holder 102, and a sufficiently large focusing current can be supplied to the focusing coil 109, thus obtaining a large driving force.

The lens holder 102, i.e., the focusing coil 109 is arranged in a focusing magnetic circuit 110 fixed on the upper lid 15A of the rotary drum 105. The focusing magnetic circuit 110 comprises a ring-like magnet 111, a ring-like yoke 112 arranged on the magnet 111, and a planar yoke 113 which surrounds the outer surfaces of the magnet 111 and the yoke 112, is formed to support the bottom surface of the magnet 111, and is fixed on the rotary drum 105. The rotary drum 105 is arranged in a gap between a combination of the magnet 111 and the yoke 112 and the planar yoke 113.

When a current according to a focusing error of the objective lens 101 is flowed through the focusing coil 109, the lens holder 102 is moved in the optical axis direction of the arrow Z by an electromagnetic effect of this current and magnetic fluxes generated by the focusing magnetic circuit 110. As a result, the objective lens 101 is moved together with the lens holder 102, thus performing focusing control.

Since the focusing magnetic circuit 110 is arranged to surround the focusing coil 109 wound inside the lens holder 102, it is very compact as compared to a conventional rotary optical head in which a focusing magnetic circuit radially extends, and hence, the entire optical head can be rendered compact. In addition, in the focusing magnetic circuit 110, almost all the generated magnetic fluxes are effectively used to interlink with the focusing coil 109 unlike in a focusing magnetic circuit of a conventional rotary type optical head. Therefore, a driving force for moving the objective lens 101 in the optical axis direction can be increased although the focusing magnetic circuit is compact.

Figure 9:
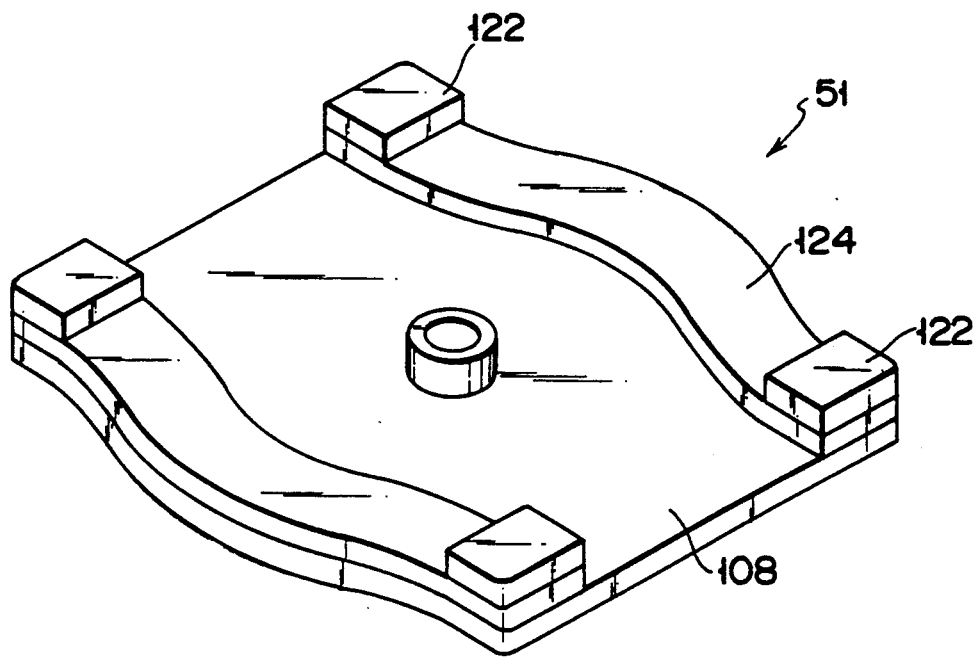
FIG. 9 is a perspective view showing a stationary base shown in FIG. 1.

A pair of radial coils 114 are directly fixed to two end portions of the upper lid 15A near the leaf spring fixing members 104. A pair of radial magnetic circuits 120 are arranged outside the rotary drum 105 and on the stationary base 108. Each radial magnetic circuit 120 is constituted by the stationary base 108, flat magnets 121 and 122, a center yoke 123, and a back yoke 124. The center yoke 123 is arranged between the magnets 121 and 122, and the back yoke 124 is arranged on the magnet 122. As shown in FIG. 9, the stationary base 108 has a section as a magnetic path serving as a yoke corresponding to the back yoke 124 and each magnet 122 is placed on and fixed to this section. The center yoke 123 is inserted in the radial coil 114 so that the radial coil 114 is slidable on the center yoke 123, as shown in FIG. 1.

In the optical head apparatus shown in FIG. 1, the upper lid 15A is formed of a ceramic having a large thermal resistance, as has been described with reference to FIG. 7A, and the lower lid 15B is formed of aluminum having a small thermal resistance. Therefore, even if heat is generated from the radial coils 114, heat is not transmitted to the laser diode 202 and the photodetector 201 through the ceramic upper lid 15A, and the laser diode 202 and the photodetector 201 can be prevented from being overheated. Since heat generated at the laser diode 202 is quickly dissipated through the aluminum lid 15B having a small thermal resistance, the service life of the laser diode 202 can be prolonged, and an increase in noise level of the photodetector 201 can be prevented. A ceramic as a material of the upper lid 15A has a smaller thermal expansion coefficient as compared to aluminum as a material of the lower lid 15B. However, since the aluminum lower lid 15B has a relatively higher temperature than that of the ceramic upper lid 15A adjacent to the radial coils 114 as a heat generation source, a difference between their thermal expansion coefficients is decreased, and the rotary drum will not be adversely influenced by a thermal distortion. Since ceramics are non-conductive substances, a coil can be directly adhered onto the upper lid 15A of the rotary drum without using a coil fixing plate. As a result, since a resonance frequency of a vibration system constituted by the radial coils 114 and the rotary drum 105 can be increased, a wide servo range can be stably assured, and high-precision control can be expected. Furthermore, when a porous $\beta$ ceramic is used as a ceramic material, a lightweight rotary drum can be obtained, and an access time can be shortened.

Figure 10:
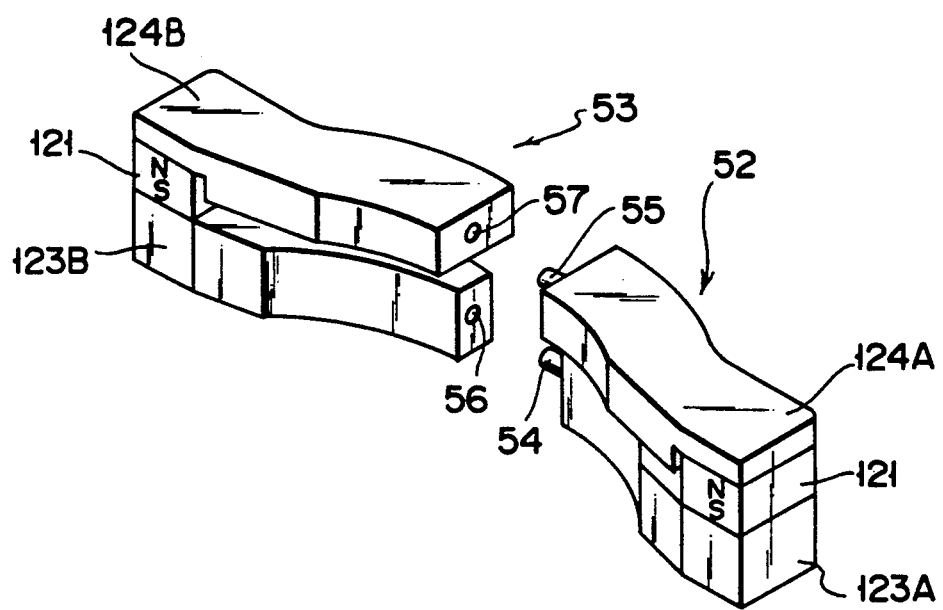
FIG. 10 is a perspective view showing a unit constituting a radial magnetic circuit shown in FIG. 1.

As shown in FIG. 10, the center yoke 123 and the back yoke 124 are formed to be able to separate into two sections 123A, 123B, 124A, and 124B. These sections 123A, 123B, 124A, and 124B are inserted in each radial coil 114 and are coupled to each other, thus assembling the magnetic circuit. More specifically, a first unit 51 in which the radial coils 114 are fixed to the lower lid 15B, and the permanent magnets 122 are adhered to the base 108, a pair of second units 52 in each of which the center yoke section 123A, the back yoke section 124A, and the permanent magnet 121 are adhered to each other, and a pair of third units 53 in each of which the center yoke section 123B, the back yoke section 124B, and the permanent magnet 121 are adhered to each other are prepared. Thereafter, one of the pair of second units 52 and one of the pair of third units 53 are fixed on the first unit 51 using a jig. The shaft 107 of the rotary drum 105 is fitted in the base 108 of the first unit 51, and the rotary drum 105 is rotated counterclockwise in FIG. 3, thus inserting the pair of radial coils 114 into the corresponding center yoke sections 123A and 123B. Finally, the remaining second unit 52 and the remaining third unit 53 are mounted on and fixed to the fixed second and third units 52 and 53. In order to facilitate this assembly and fixing of these units, it is preferable that a projection 54 is formed on one of the center yoke sections 123A and 123B, and a recess 56 is formed in the other, and a projection 55 is formed on one of the back yoke sections 124A and 124B, and a recess 57 is formed in the other. Since the projections 54 and 55 and the recesses 56 and 57 are formed, when the second and third units 52 and 53 are coupled, the coupled portion can be prevented from being inclined to be attracted by the first unit 51, thus precisely assembling the apparatus More specifically, if one of the second units is precisely fixed, the following assembly step can be much facilitated. In addition, no gap is formed between the coupled portion of the units, and a uniform magnetic field can be maintained. Therefore, a variation in generated force can be eliminated, and a stable control operation is allowed.

With the above-mentioned assembly method, the coils can be assembled to the magnetic circuits after they are adhered to the rotary drum in advance using a precise jig. Thus, the coils can be directly mounted on the rotary drum without using coil fixing plates, and a mechanical strength of the mounted portion between the coil and the rotary drum can be increased. As a result, a wide servo range can be assured, and precise positioning control can be achieved.

With the apparatus assembled in this manner, a resonance frequency of a resonance system constituted by the rotary body and the coils can be increased, a wide servo range can be assured, and stability of positioning control of the objective lens can be noticeably improved. In addition, since the projections are formed at the portions to be coupled, a uniform magnetic field can be kept, and a variation in generated force can be eliminated, resulting in a stable control operation.

The electrical parts such as the photodetector 201, the laser diode 202, and the like arranged in the rotary drum 105 receive an electrical power or signals externally from a flexible printed circuit 140, as shown in FIG. 3. The flexible printed circuit 140 is arranged at a position substantially symmetrical with the objective lens 101 with respect to the central shaft 107 and is connected to the side surface of the arcuated portion of the rotary drum 105. One end of the circuit 140 is fixed to the side surface of the upper lid 15A of the rotary drum 105 by a pin 144, and the other end thereof is fixed to a stud 141 by a pin 143, so that the circuit 140 is maintained in a curved state. In the drawings excluding FIG. 3, the flexible printed circuit 140, the pins 143 and 144, and the stud 141 are omitted for the sake of simplicity.

As described above, since the flexible printed circuit 140 is used, no wiring space is required on the upper or lower surface of the rotary drum 105. Therefore, the shaft 107 need not be unnecessarily prolonged or the height of each leaf spring fixing member 104 need not be increased. Thus, the resonance frequency of a vibration system formed by the rotary drum 105 and the shaft 107 can be increased, thereby preventing stability of positioning control of the objective lens from being considerably impaired. Since the flexible printed circuit 140 is mounted in the curved state, a radial force directly acts on the ball bearing 106 by the restoration force of the flexible printed circuit 140, and a radial play can be limited without applying a thrust pre-load. In general, in a ball bearing, since an increase in wear resistance upon application of a radial load is very smaller than an increase in wear resistance upon application of a thrust load, a rotational resistance can be sufficiently decreased, and as a result, high-precision positioning control is allowed. If the rotary drum 105 is rotated, the restoration force of the flexible printed circuit 140 always acts on the rotary drum 105.

The flexible printed circuit 140 is fixed on the side surface of the arcuated portion of the rotary drum 105 and the side surface of the stud 141 having an arcuated surface which has the rotational axis as the center, and the rotary drum 105 and the flexible printed the stud 141 have non-fixed contact areas each corresponding to an angle larger than $\frac{1}{2}$ and smaller than 1/1 of a predetermined rotation angle of the rotary drum 105. In a conventional linear type apparatus, the flexible printed circuit 140 is maintained in a curved state in order to decrease a resistance by the flexible printed circuit 140. In this case, since movable and stationary sides are parallel to each other, non-fixed contact areas can be freely selected. However, in a rotary type apparatus, if too large a contact area is set, the flexible printed circuit 140 partially floats from the convex curved surface, and as a result, a restoration force is nonlinearly changed, thus considerably impairing positioning precision of rotation. However, since the contact areas between the rotary drum 105 and the flexible printed circuit 140 and between the flexible printed circuit 140 and the stud 141 are limited to the above-mentioned range, the flexible printed circuit 140 can be prevented from floating, thus guaranteeing high positioning precision.

When a current is flowed through the radial coils 114, the objective lens 101 is moved together with the lens holder 102 in the radial direction of the optical disk 200 indicated by an arrow X, i.e., in the tracking direction, thereby accessing a desired tracking guide. Thus, the objective lens 101 is tracking-controlled to trace the desired tracking guide with a light beam.

In the apparatus shown in FIG. 1, when the rotary drum 105 is rotated up to a maximum rotational angle, the sides of the triangular section 105B are almost parallel to portions of the yokes 123 and 124 of the radial magnetic circuits, and stoppers 22 and 23 are mounted on these portions of the yokes 123 and 124 as shown in FIG. 25. In addition, the cross-sectional area of the rotary drum 105 is gradually increased from the position where the drum contacts the stoppers 22 and 23 toward the rotational center.

In this manner, the rotary drum 105 has the triangular section 105B, and when the drum 105 is rotated up to the maximum angle, the triangular section 105B is brought into contact with the stoppers 22 and 23. Since the cross-sectional area of the rotary drum 105 is gradually increased from the position where the drum contacts the stoppers 22 and 23 toward the rotational center and a generated moment is gradually increased from the position where the drum contacts the stoppers 22 and 23 toward the rotational center, even if the rotary drum 105 collides against the stoppers 22 and 23, it is not easily deformed by collision. When the rotary drum 105 is rotated up to the maximum rotational angle, the sides of the triangular section 105B of the rotary drum are almost parallel to the portions of the yokes 123 and 124 of the opposing magnetic circuits 120, and the stoppers 22 and 23 are mounted on the yokes 123 and 124. Therefore, when the rotary drum is rotated up to the maximum rotational angle, the relative positional precision between the rotary drum 105 and the magnetic circuits can be improved. Since the stoppers 22 and 23 are arranged, the coils attached to the rotary drum 105 will not collide against the magnetic circuits. Therefore, a movable range can be maximized.

In this manner, since the stoppers are provided to the apparatus, there can be realized an optical apparatus in which the rotary drum assembled with the optical components is moved at high speed and is fed by a large amplitude to allow high-speed access, and the rotary body can be prevented from being deformed upon collision against the stopper.

Figure 11:
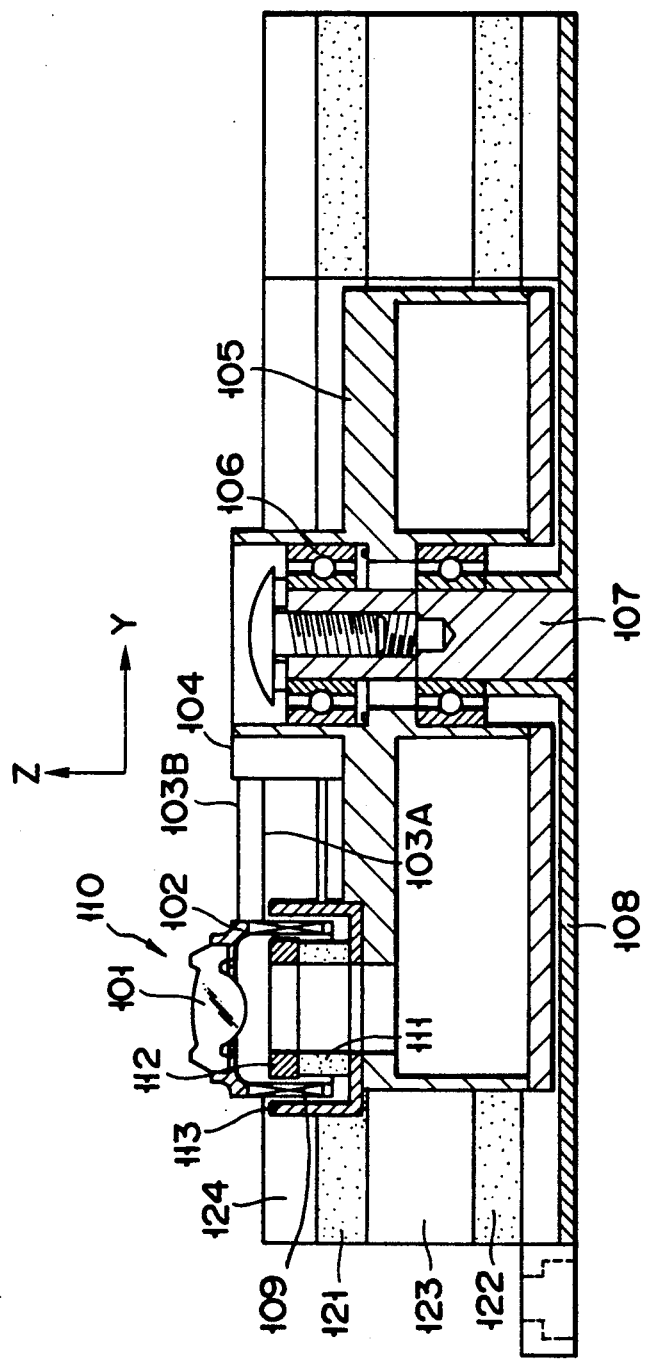
FIG. 11 is a sectional view of the optical head apparatus shown in FIG. 1.

The magnet 111 in the focusing magnetic circuit 110 and the magnets 121 in the radial magnetic circuits 120 near the magnet 111 are arranged at almost the same positions in the Z direction, i.e., in the optical axis direction of the objective lens 101, as shown in FIG. 11. In an actual apparatus, as shown in FIG. 12A, the magnets 111 and 121 may be arranged to be slightly offset from each other in the Z direction. As shown in FIG. 12A, the magnets 111 and 121 are magnetized in the Z direction, so that their magnetized polarities are opposite to each other. In this arrangement, since a distance between magnetic poles having the same polarity becomes shorter than that between magnetic poles having different polarities, a repulsion force is generated between the magnets 111 and 121. Therefore, the focusing magnetic circuit 110 can be prevented from being attracted by the radial magnetic circuits 120, thus facilitating movement of the objective lens 101 in the optical axis direction by an interaction between the focusing coil 109 and the focusing magnetic circuit 110.

Detailed numerical values will be presented below. A force required for rotating the focusing magnetic circuit 110 against the radial magnetic circuits 120 when the objective lens 101 is moved in the direction of the arrow Z (to be referred to as a peeling force hereinafter) is about 20 g when the magnets 111 and 121 are arranged to attract each other, while the force is considerably decreased to about 3 g when the magnets 111 and 121 are arranged to repel each other, as shown in FIG. 12A.

As shown in FIG. 12A, the magnet 111 of the focusing magnetic circuit 110 may be slightly offset from the magnets 121 of the radial magnetic circuits 120 in the optical axis direction, or as shown in FIG. 12B, the magnets 111 and 121 may be arranged at the same position in the optical axis direction to have the same directions of magnetic poles. Alternatively, as shown in FIG. 12C, the magnet 111 may be offset from the magnets 121 by a distance equal to the thickness of the magnet 111 or more. In this case, as shown in FIG. 12C, the directions of the magnetic poles of the magnets 111 and 121 are reversed to generate a repulsion force between the magnets 111 and 121, thus obtaining the same effect as described above.

As described above, the radial magnetic circuits 120 are arranged on the stationary base 108, and the focusing magnetic circuit 110 is arranged on the rotary drum 105, so that the focusing and radial magnetic circuits 110 and 120 can be independently designed More specifically, the focusing coil 109 need only be movable in the optical axis direction of the objective lens, and need not radially extend unlike in the conventional apparatus. Therefore, the optical head apparatus can be rendered compact. The focusing magnetic circuit 110 need only be arranged in a moving range of the focusing coil 109 in the optical axis direction of the objective lens 101. Therefore, generated magnetic fluxes can effectively act on the focusing coil 109, and as a result, an electromagnetic force acting on the coils, i.e., a driving force for moving the objective lens 101 in the optical axis direction can be increased. The magnets in the focusing and radial magnetic circuits 110 and 120 are magnetized in the optical axis direction of the objective lens 101, and at least some magnets in the radial magnetic circuits, e.g., the magnets on the side opposing the magnet of the focusing magnetic circuit 110 are arranged to repel the magnet in the focusing magnetic circuit 110, thus allowing easy radial movement of the objective lens 101. More specifically, if the focusing magnetic circuit 109 is arranged on the rotary drum 105 and the focusing magnetic circuit 110 is moved to the radial magnetic circuits 120 arranged on the stationary base when the rotary drum is radially rotated, a magnetic mutual interference between the focusing and radial magnetic circuits need not be take into consideration. More specifically, when an attraction force acts between these magnetic circuits, the focusing magnetic circuit 110 tends not to be easily radially moved, and can be prevented from disturbing radial movement of the objective lens 101.

Figure 13:
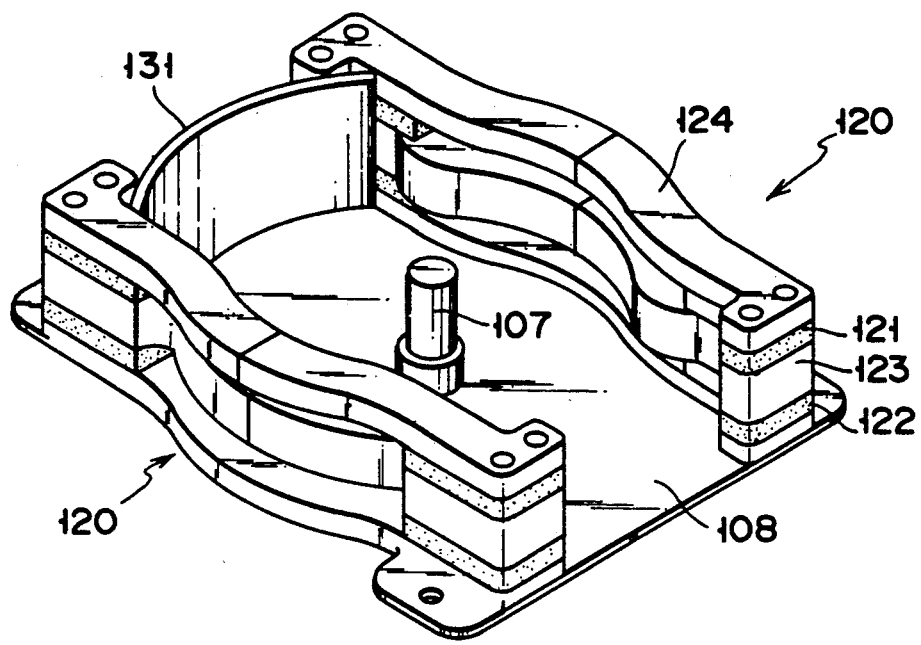
FIG. 13 is a perspective view showing a modification of the radial magnetic circuit shown in FIG. 1.
Figure 14:
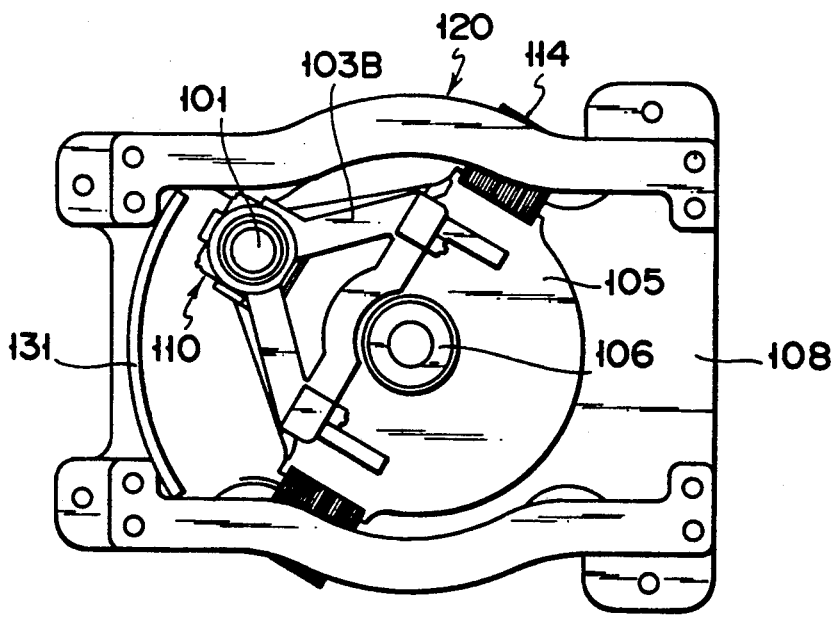
FIG. 14 is a plan view of the optical head apparatus in which the rotary body is assembled to the magnetic circuit shown in FIG. 13.

As shown in FIGS. 13 and 14, a semi-arcuated magnetic plate 131 formed of a magnetic material may be arranged between the focusing and radial magnetic circuits 110 and 120. The material of the magnetic plate 131 is most preferably a ferromagnetic material such as iron. With the magnetic plate 131, the focusing and radial magnetic circuits 110 and 120 are magnetically shielded from each other. In other words, the magnetic plate 131 forms a magnetic path for short-circuiting magnetic fluxes leaked from the radial magnetic circuits 120, and can effectively suppress the leaked magnetic fluxes to act on the focusing magnetic circuit 110. Therefore, the magnetic interaction between the magnetic circuits 110 and 120, i.e., a repulsion force is decreased, and the radial movement of the objective lens 101 can be further facilitated. In the optical head apparatus shown in FIG. 14, the above-mentioned peeling force is decreased to about 2 g.

Figure 15:
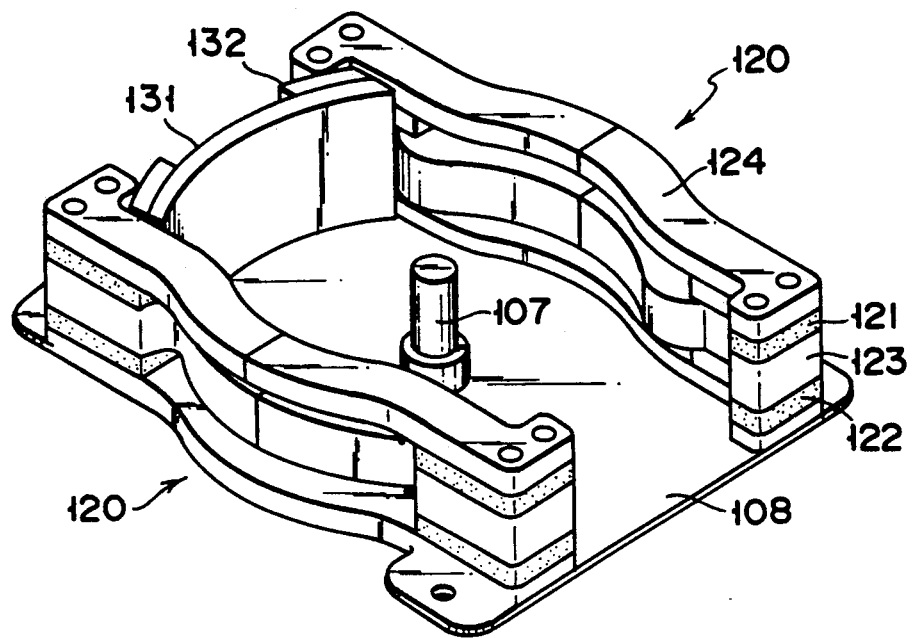
FIG. 15 is a perspective view showing another modification of the radial magnetic circuit shown in FIG. 1.
Figure 16:
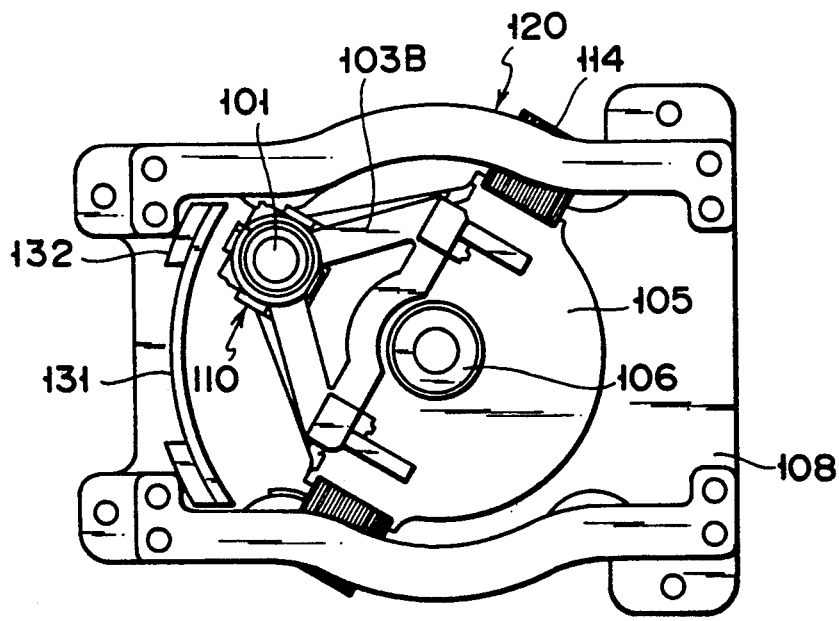
FIG. 16 is a plan view of a optical head apparatus in which the rotary body is assembled to the magnetic circuit shown in FIG. 15

Furthermore, as shown in FIGS. 15 and 16, non-magnetic plates 132 formed of a non-magnetic material may be inserted between the two ends of the magnetic plate 131 and the radial magnetic circuits 120. The material of the non-magnetic plate 132 is not limited as long as it is a non-magnetic material, and is preferably a resin or aluminum. In this manner, when the magnetic plate 131 is supported through the non-magnetic plates 132, the magnetic plate 131 is separated from the radial magnetic circuits 120 by a distance corresponding to the thickness of the non-magnetic plate 132. As a result, magnetic fluxes flowing from the radial magnetic circuits 120 to the magnetic plate 131 are decreased, and the magnetic interaction between the magnetic circuits 110 and 120 can be further decreased. In the optical head apparatus shown in FIGS. 15 and 16, the above-mentioned peeling force can be decreased to about 1 g, and radial movement of the objective lens 101 can be further facilitated.

When the magnetic member (plate) 131 is arranged between the focusing and radial magnetic circuits 110 and 120, the magnetic circuits 110 and 120 are magnetically shielded, and the radial movement of the objective lens can also be facilitated. When the magnetic member 131 is mounted between the radial magnetic circuits 120 through the non-magnetic members, magnetic fluxes flowing from the radial magnetic circuits 120 to the magnetic member can be decreased, resulting in a more effective apparatus.

Figure 17:
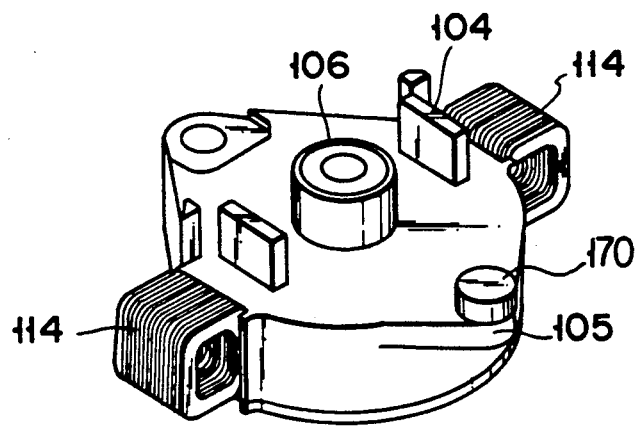
FIG. 17 is a plan view of a modification of the rotary body shown in FIG. 1.
Figure 18:
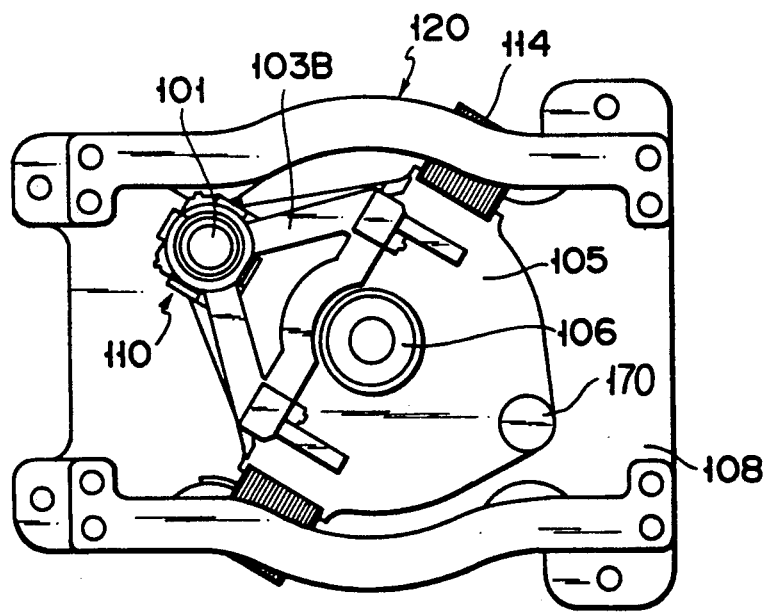
FIG. 18 is a plan view of an optical head apparatus in which the rotary body shown in FIG. 17 is assembled to the radial magnetic circuit.

Furthermore, as shown in FIGS. 17 and 18, a sub magnet 170 which is magnetized in the optical axis direction of the objective lens 101 to have opposite polarities to that of the magnet 111 may be mounted at a position almost symmetrical with the magnet 111 of the focusing magnetic circuit 110 with respect to the shaft 107 as the rotational center of the rotary drum 105. According to the optical head apparatus shown in FIGS. 17 and 18, a moment having an opposite direction and substantially the same magnitude as those of a rotational moment caused by an interaction between the magnets of the focusing and radial magnetic circuits 110 and 120 is generated by an interaction between the sub magnet 170 and the magnets of the radial magnetic circuits 120. Therefore, the rotational moment caused by the interaction between the magnets of the focusing and radial magnetic circuits 110 and 120 is canceled by the new rotational moment generated by the sub magnet 170. Thus, the radial movement of the objective lens 101 can be facilitated.

As described above, when a sub magnet which is magnetized in the optical axis direction of the objective lens 101 to have opposite polarities to those of the magnet of the focusing magnetic circuit 110 is attached at a position substantially symmetrical with the magnet of the focusing magnetic circuit with respect to the rotational center of the rotary drum 105, a moment for canceling a rotational moment caused by an interaction between the magnets of the focusing and radial magnetic circuits 110 and 120 is generated by an interaction between the sub magnet and the magnets of the radial magnetic circuits 120, thus facilitating the radial movement of the objective lens.

In the apparatus shown in FIG. 1, a moment of inertia of each tracking (radial) coil 114 is selected to be equal to a total moment of inertia of the rotary drum 105 and all the components to be driven together with the rotary drum 105 (excluding the tracking coils 114). With this arrangement, the driving force of the rotary drum 105 can be increased as compared to the conventional apparatus. This principle will be explained below.

An angular acceleration $\theta$[rad/s$^2$] obtained when a movable body (the rotary drum 105 and all the components to be driven together with the rotary drum 105) having a moment It [kg·m$^2$] of inertia is driven by a coil (tracking coils 114) of mc [kg] is given by:

$$\theta = \frac{fc \cdot rc}{IN + mc \cdot rc} = \frac{T}{It} = \frac{T}{Ic + In} \quad (1)$$

fc: a force generated in the coil [kg·m/s$^2$]
rc: a distance from the rotational center to the center of gravity of the coil [m]
Ic a moment of inertia of the coil [kg·m$^2$]
In: a moment of inertia excluding the coil [kg·m$^2$]
T: a generated torque [N·m]

Therefore, an acceleration ar [m/s$^2$] of the objective lens 101 can be given by:

$$ar = r \cdot \theta = \frac{fc \cdot rc \cdot r}{In + mc \cdot rc^2} \quad (2)$$

r: a distance from the rotational center to the center of gravity of the objective lens 101 [m]

As can be seen from the above equations, when power consumption and the mounting position of the objective lens 1 are assumed to be constant, the acceleration is expressed as a function of the mass of the coil and the coil mounting position.

$$\frac{\partial ar}{\partial rc} = \frac{fc \cdot In - fc \cdot mc \cdot rc^2}{In - mc \cdot rc2^2} \quad (3)$$

$$\frac{\partial ar}{\partial mc} = \frac{C(rc \cdot In - mc \cdot rc^3)}{2(In + mc \cdot rc^2) \cdot \sqrt{mc}} \quad (4)$$

In order to obtain a maximum acceleration, equations (3) and (4) can be given by 0:

$$\frac{\partial ar}{\partial rc} = 0 \rightarrow In = mc \cdot rc^2 \quad (5)$$

$$\frac{\partial ar}{\partial mc} = 0 \rightarrow In = mc \cdot rc^2 \quad (6)$$

The maximum acceleration is obtained when the moment of inertia of the coil becomes equal to that of the moving body excluding the coil. The obtained maximum acceleration can be constant if the relationship given by equation (5) (or (6)) is kept established between the coil mounting position and the mass of the coil.

A light beam emerging from the objective lens 101 of the optical disk apparatus can be positioned at a required track on the optical disk at high speed. When the mounting positions of the tracking coils 114 are separated away from the central shaft 107, the mass of each tracking coil 114 can be decreased.

In this embodiment, the mass of the focusing coil 109 is designed to be equal to a total of halves of the masses of the objective lens 101, the lens holder 102, and the leaf spring 103. With this structure, the driving force of the objective lens 101, the lens holder 102, and the leaf spring 103 can be increased as compared to a conventional structure. This principle will be explained below.

In general, a force Fc generated in a coil is given by:

$$Fc = G \cdot l \cdot I \cdot P \quad (7)$$

G: magnetic flux density [T]
l: coil length [m]
I: current flowing through coil [A]
P: coil utilization efficiency (ratio of coil present in magnetic field)

A coil consumption power Wc is given by:

$$Wc = R \cdot I^2 \quad (8)$$

R: coil resistance [Ω]

The coil resistance R is given by:

$$R = \frac{k \cdot l}{S} \quad (9)$$

k: coil material resistivity [Ω·m]
S: coil cross-sectional area [m²]

The mass, length, and cross-sectional area of the coil have the following relationship:

$$l \cdot S = \frac{m}{q} = e \cdot V \quad (10)$$

m: coil mass [kg]
q: coil material density [kg/m³]
e: coil volume efficiency
V: coil volume [m³]

Therefore, the following equation can be derived from equations (8), (9), and (10):

$$Wc = \frac{k \cdot l \cdot I^2}{S} = \frac{k \cdot l^2 \cdot I^2}{e \cdot V} \quad (11)$$

Equations (7) and (11) consequently yield the following equation:

$$Fc = P \cdot G \cdot \sqrt{\frac{e \cdot V \cdot Wc}{k}} = P \cdot G \cdot \sqrt{\frac{m \cdot Wc}{q \cdot k}} \quad (12)$$

An acceleration $a_l$ [m/s²] obtained when a load mass of M [kg] is driven by a coil of [kg] is given by:

$$a_l = \frac{Fc}{M + m} = C \cdot \frac{\sqrt{m}}{M + m} \quad (13)$$

for $$C = P \cdot G \cdot \sqrt{\frac{Wc}{q \cdot k}}$$

Therefore, assuming that power consumption is constant, the maximum acceleration is obtained when the coil mass is equal to the load mass, and a body to be driven can be driven faster than at any other mass ratio. As described above, the driving force of the movable body can be maximized without increasing power consumption of the optical head apparatus, and positioning can be achieved at higher speed.

Figure 19:
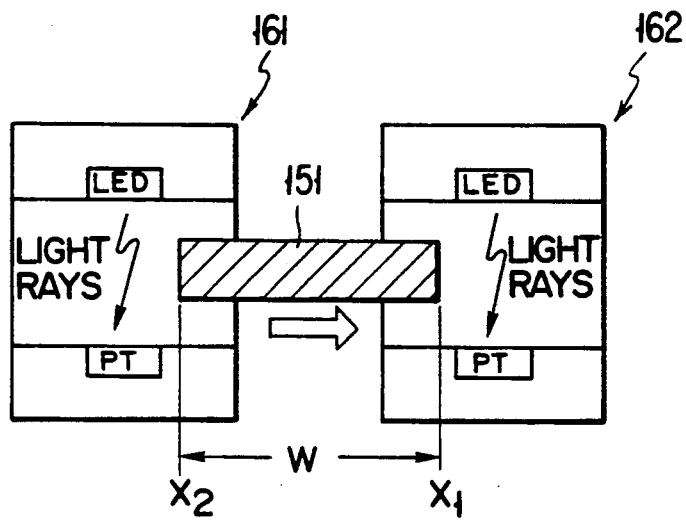
FIG. 19 shows a simplified position detection device shown in FIG. 1 to explain its principle.

In the optical head apparatus shown in FIG. 1, the rotational position of the rotary drum 105, especially, the radial position of the objective lens 101 is detected by a detection apparatus comprising first and second shutter members 151 and 152 arranged on the rotary drum 105, photointerrupters 161 and 162 serving as first and second position detection elements arranged on the stationary base 108, and a detector 150 for logically discriminating the output signals from the photointerrupters 161 and 162 to obtain the position of the objective lens 101. The shutter members 151 and 152 are formed to be flat, and extend along the rotational direction of the rotary drum 105, e.g., the peripheral edge of the rotary drum 105 to be parallel to and separated from the optical disk 200 at a predetermined distance. Each of the photointerrupters 161 and 162 comprises a light-emitting element, e.g., a photodiode LED, and an opposing light-receiving element, e.g., a phototransistor PT, as shown in FIG. 19. The photointerrupters 161 and 162 are arranged along the rotational direction of the rotary drum 105 to be separated from each other by a predetermined distance. Upon rotation of the rotary drum 105, the shutter members 151 and 152 are fixed to the rotary drum 105 so as to respectively enter magnetic gaps formed between the center yokes 123 and the back yokes 124.

Figure 20:
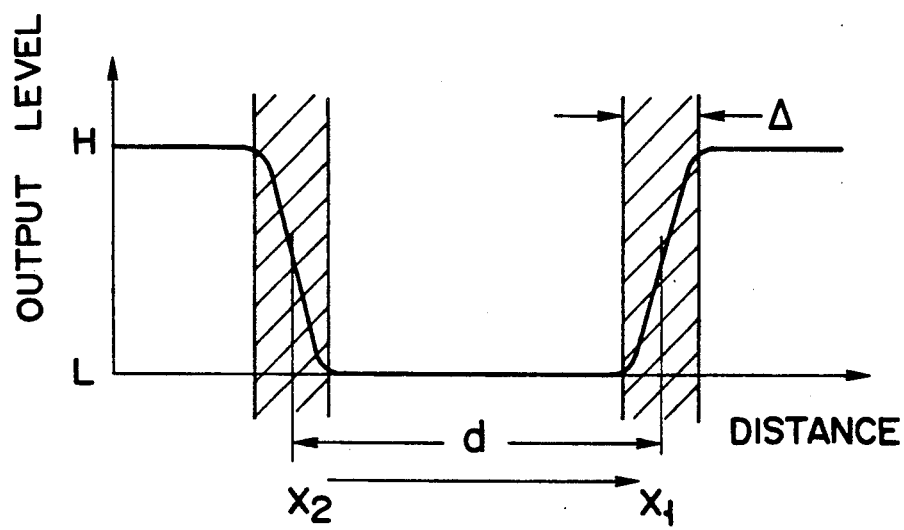
FIG. 20 is a graph showing the relationship between the position of a shutter shown in FIG. 19 and an output signal from a photointerrupter.
Figure 21:
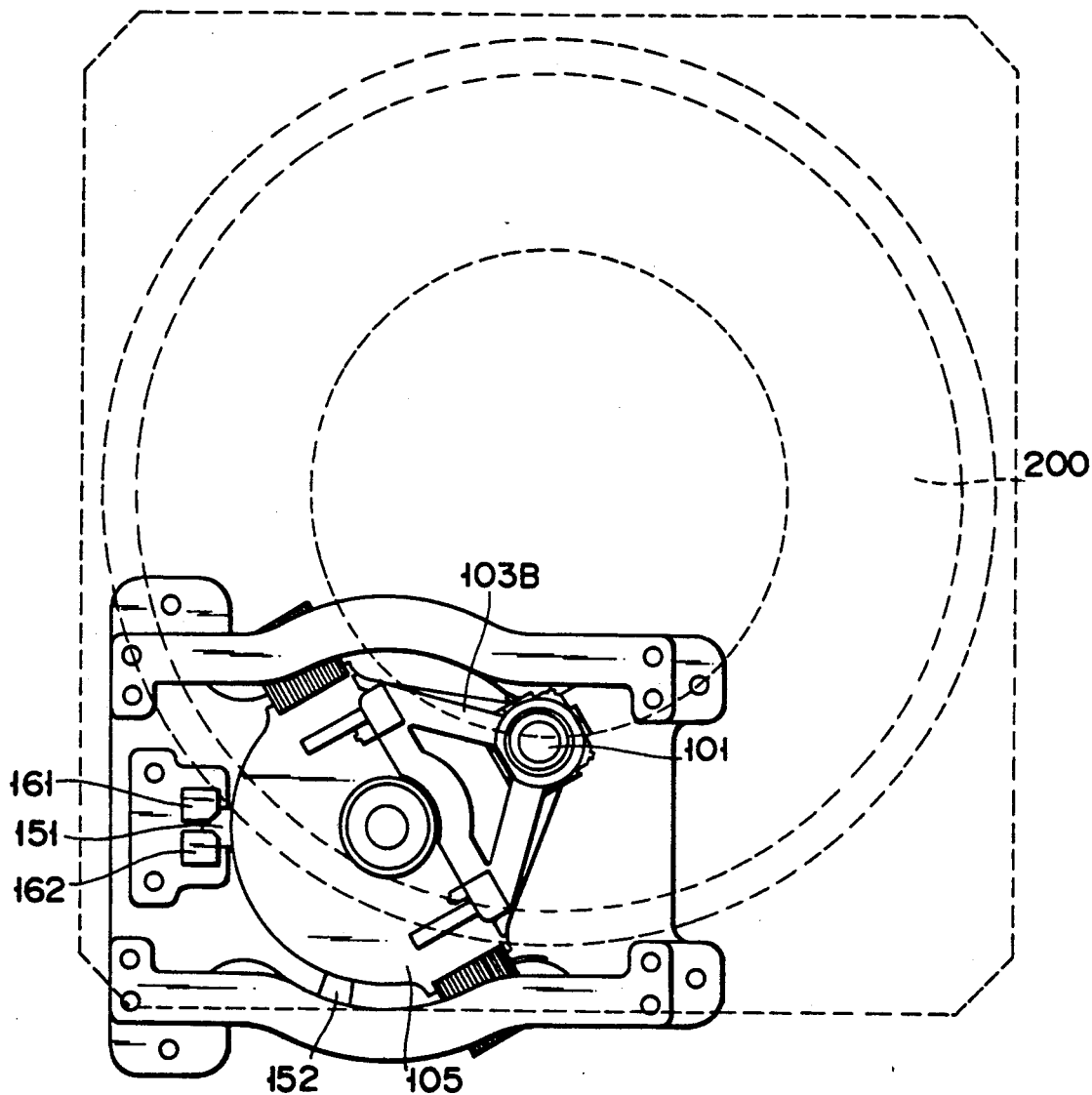
FIGS. 21 and 22 are plan views showing an arrangement of the rotary body when an objective lens shown in FIG. 1 is located at the innermost and outermost peripheral positions of an optical disk.
Figure 22:
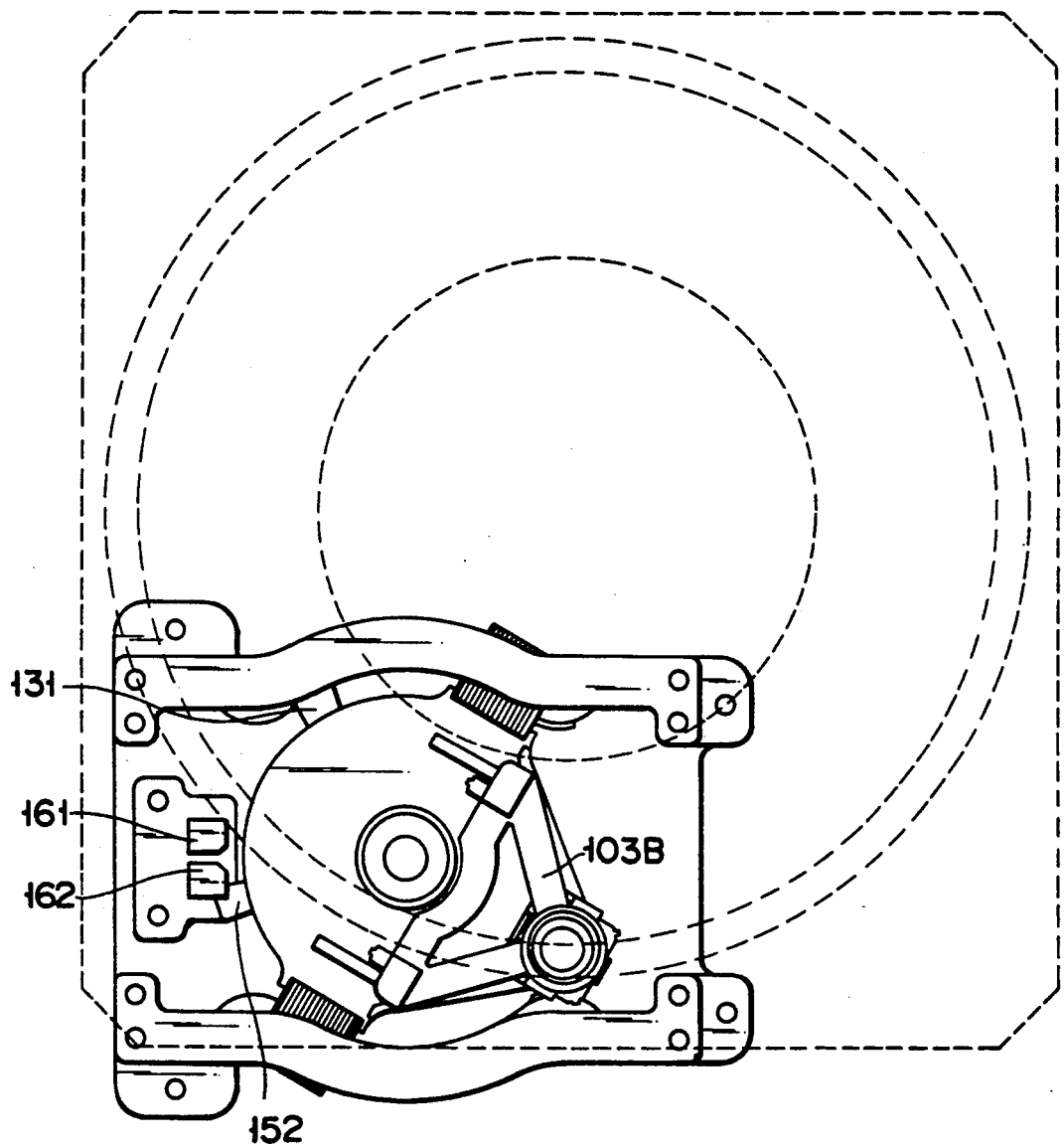

The arrangement condition of the shutter member 151 and 152 and the photointerrupters 161 and 162 will be described below with reference to FIGS. 19 to 22. FIG. 19 shows a state wherein the shutter member 131 passes between the photointerrupters 161 and 162, and FIG. 20 shows changes in output signals from the photointerrupters 161 and 162 as a function of changes in positions of edges x1 and x2 upon movement of the shutter member 151. FIGS. 19 and 20 are illustrated to have a positional correspondence therebetween. FIG. 21 is a plan view when the objective lens 101 is located at the innermost periphery of the optical disk 200 as a first end of a rotational range of the rotary drum 105, and FIG. 22 is a plan view when the objective lens 101 is located at the outermost periphery of the optical disk 200 as the second end of the rotational range of the rotary drum 105.

As shown in FIGS. 19 and 20, a distance between detection centers of the photointerrupters 161 and 162 in the rotational direction of the rotary drum 105, i.e., positions of edges x of the shutter member 131 where output signals V1 and V2 from the photointerrupters indicate a middle level M between high and low levels H and L is represented by d, a position range of the edge x where the output signals V1 and V2 from the photointerrupters 161 and 162 indicate the middle level is represented by Δ, and the width of each of the shutter members 151 and 152 in the rotational direction of the rotary drum 105 is represented by W. In this case, these parameters satisfy the following relation:

$$W - \Delta < d < W + \Delta$$

The first shutter member 151 is located at a position where it is simultaneously detected by the photointerrupters 161 and 162 when the objective lens 101 is located at the innermost periphery of the optical disk 200, as shown in FIG. 21. The second shutter member 132 is located at a position where it is detected by the second photointerrupter 162 when the rotary drum 105 is located at the outermost periphery of the optical disk 200, as shown in FIG. 22.

Under the above-mentioned conditions, when the photointerrupters 161 and 162 detect the shutter members 151 and 152, i.e., when optical paths between the light-emitting elements LED and the light-receiving elements PT are completely shielded by the shutter members 151 and 152, the output signals from the photointerrupters 161 and 162 go to the high level H; when the photointerrupters do not detect the shutter members 151 and 152 at all, i.e., when the shutter members 151 and 152 are not present in the optical paths between the light-emitting elements LED and the light-receiving elements PT at all, the output signals from the photointerrupters 161 and 162 go to the low level L; and in an intermediate state of those described above, the output signals from the photointerrupters 161 and 162 indicate the middle level M between the levels H and L. Thus, the position of the objective lens 101 in the radial direction of the optical disk 200 and the output signals V1 and V2 from the photointerrupters 161 and 162 have the relationship summarized in Table 1 below:

TABLE 1

| Radial Position of Objective Lens | Photointerrupter Outputs | |
|---|---|---|
| | V1 | V2 |
| Innermost Periphery | M | M |
| Near Innermost Periphery | H | L |
| Intermediate Region | L | L |
| Outermost Periphery | L | H |
| Mechanically Regulated Position | M | M |

Note that the intermediate region indicates the intermediate radial position and therearound, and FIG. 4 shows a state wherein the objective lens 101 is located in the intermediate region. The mechanically regulated position indicates a position where a pawl (not shown) on the rotary drum 105 abuts against a stopper (not shown) after the objective lens 101 exceeds the innermost peripheral position.

Therefore, when the output signals V1 and V2 from the photointerrupters 161 and 162 are logically discriminated by the detector 150, the radial position of the objective lens 101 can be determined. Especially, according to this arrangement, when the objective lens 101 is located near the innermost periphery (in an intermediate state between FIGS. 4 and 21), the shutter member 151 is detected by only the first photointerrupter 161 to detect that the objective lens 101 is present in a region near the innermost periphery. By utilizing this, the following movement control can be realized. That is, when the objective lens 101 is moved from the innermost periphery as its home position toward the innermost periphery, it is initially moved at high speed, is slowed down near the innermost periphery, and is stopped when the lens reaches the innermost periphery. In this manner, the access time can be shortened, and a reliable access operation can be performed.

Figure 23:
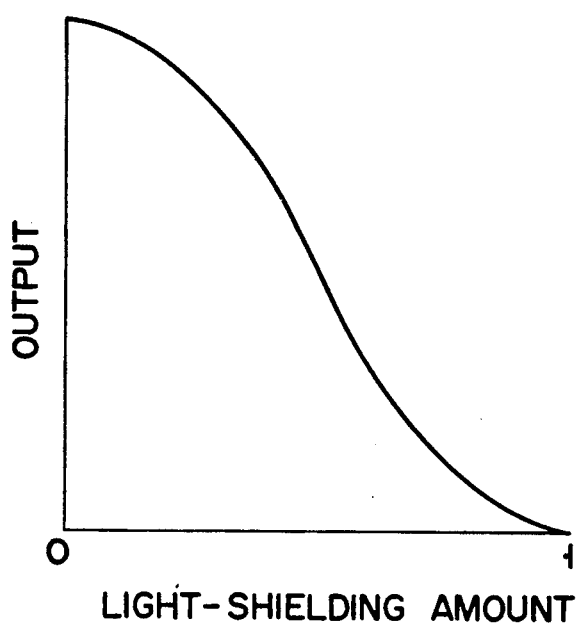
FIG. 23 is a graph showing the relationship between a degree of light shielding of a photointerrupter shown in FIG. 1 and an output signal from the photointerrupter.
Figure 24:
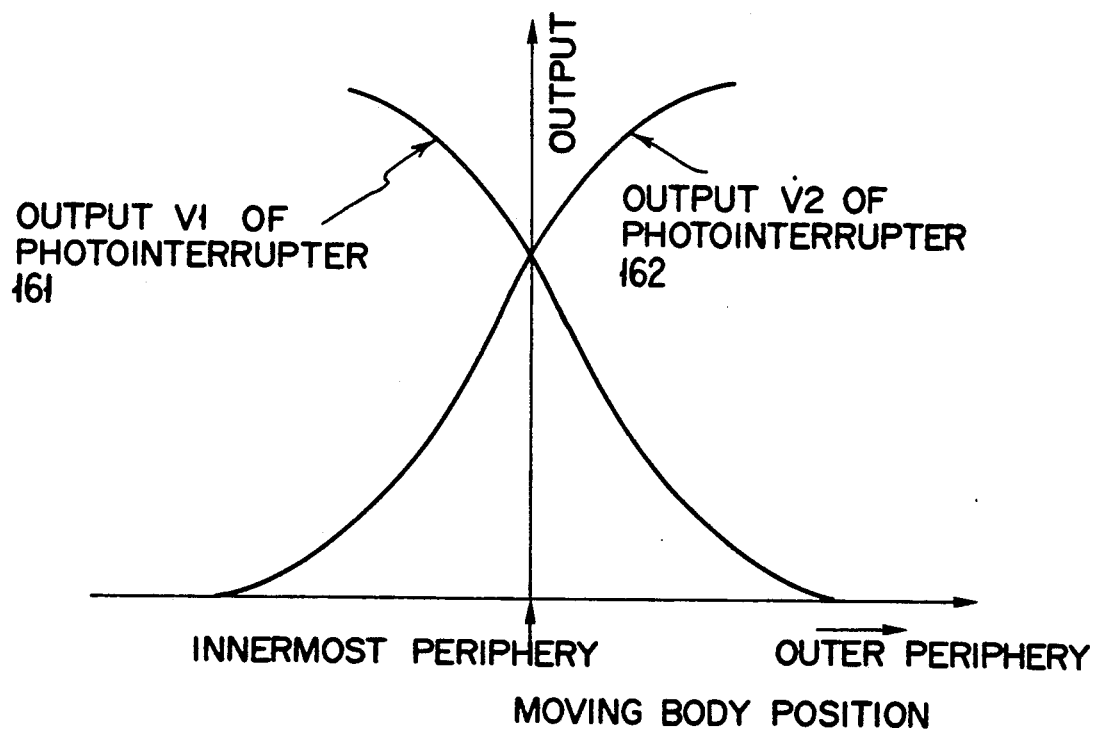
FIG. 24 is a graph showing the relationship between the moving body, including the rotary drum, shown in FIG. 1 and an output signal from a photointerrupter.

As shown in FIG. 23, the relationship between the light-shielding amount between the light-emitting and light-receiving elements of each of the photointerrupters 161 and 162 and the output signal is expressed by an S-shaped curve. Therefore, the radial position of the objective lens 101 (rotational angle of the rotary drum 105) and the output signals V1 and V2 have a symmetrical, i.e., complementary relationship about a state wherein the objective lens 101 is located at the innermost periphery position, as shown in FIG. 24. Therefore, the detector 150 calculates a difference between the output signals V1 and V2, and the rotary drum 105 is rotated through an access controller (not shown) to minimize the difference (to zero), so that the objective lens 101 can be precisely located at the innermost peripheral position as the home position.

In the above embodiment, each shutter member has a convex shape. If a recessed shutter member is used, the same effect as described above can be obtained. In the optical apparatus shown in FIG. 1, the photointerrupter is used as a detection element. However, a pattern having a change in reflectivity may be formed on the shutter member, and a photocoupler (a combination of a light-emitting element and a light-receiving element) may be used to perform position detection by utilizing reflected light. Furthermore, the rotary type optical head apparatus shown in FIG. 1 has been described in the above embodiment. However, the above-mentioned position detection device can be applied to an optical head for linearly moving an objective lens in the radial direction of an optical disk using an objective lens, and may be applied to other applications without being limited to the optical head apparatus.

According to the position detection device shown in FIG. 1, since the distance between the detection elements can be as large as the width of the shutter member, it can be detected whether or not the position of a moving body is near the end of a moving range. As shown in FIG. 1, when the position detection device is applied to the rotary type optical head, whether the position of the objective lens in the radial direction of the optical disk corresponds to the innermost periphery (or outermost periphery) or a nearby position can be detected. For example, position data for accurately performing positioning to the innermost periphery (or outermost periphery) as the home position can be obtained.

A preamplifier is preferably provided to the rotary drum 105, as shown in FIG. 25. More specifically, a detection signal output from the photodetector 201 is amplified by a preamplifier 220, and the amplified signal is supplied to an external signal processing system (not shown) through the flexible printed circuit 140. The flexible printed circuit 140 and the preamplifier 220 are fixed, as shown in FIG. 26. More specifically, a projection 221 is formed on the rotary drum 105 at a position symmetrical with the objective lens 101 to have the rotational shaft 107 of the rotary drum 105 as the center. A hole 222 is formed in one end of the flexible printed circuit 140. In addition, a hole or recess 223 is formed in the preamplifier 220. The projection 221 formed on the rotary drum 105, the hole 222 of the flexible printed circuit 140, and the hole or recess 223 of the preamplifier 220 are engaged with each other, thus directly coupling the preamplifier 220 and the rotary drum 105.

Since the preamplifier 220 and the flexible printed circuit 140 are fixed to the projection 221 formed on the rotary drum 105, as shown in FIG. 26, a bonding strength of the preamplifier 220 with respect to the rotary drum 105 can be remarkably increased. A resonance frequency defined by the preamplifier 220 and the coupled portion can be set to be 10 kHz or higher. It was experimentally demonstrated hat it was not preferable that the resonance frequency generated in the rotary body was not more than 10 to 13 kHz in the optical disk apparatus in which the rotary drum 105 carried the preamplifier 220. This is because since the track width of the optical disk is as very small as 1 to 2 $\mu$m, a servo range of 1 to 2 kHz is required. According to the optical head shown in FIG. 25, an optical disk apparatus which can prevent generation of resonance at a nonpreferable resonance frequency in the rotary body, can assure a necessary and sufficient servo range, and is free from tracking errors even if a disturbance occurs can be realized.

Since the preamplifier 220 is fixed to the position symmetrical with the objective lens 101 about the rotational shaft 107 on the rotary drum 105 and the pair of radial coils 114 are fixed to the rotary drum 105 at symmetrical positions with respect to a line connecting the objective lens 101 and the preamplifier 220, the mounting position of the preamplifier 220 corresponds to the node of a primary resonance mode. Therefore, no electrical contact error occurs between the preamplifier 220 and the flexible printed circuit 140 due to the resonance of the rotary drum 105.

In the embodiment of the optical head apparatus shown in FIG. 25, the projection 221 is formed on the rotary drum 105, the hole 222 is formed in the flexible printed circuit 140, and the hole or recess 223 is formed in the preamplifier 220, so that the projection 221 formed on the rotary drum 105, the hole 222 of the flexible printed circuit 140, and the hole or recess 223 of the preamplifier 220 are engaged with each other. Alternatively, a hole or recess is formed in the rotary drum 105, a hole is formed in the flexible printed circuit 140, and a projection is formed on the preamplifier 220, so that the hole or recess of the rotary drum 105, the hole of the printed circuit 140, and the projection of the preamplifier 220 may be engaged with each other, thus providing the same effect as described above. Alternatively, components other than the preamplifier 220 may be engaged with the projection or recess of the rotary drum 105.

According to the optical head apparatus shown in FIG. 25, an optical head apparatus which has a high bonding strength between the preamplifier 220 and the rotary drum 105, can set a resonance frequency of resonance generated at a coupled portion between the preamplifier 220 and other components to be 10 kHz or higher, can assure a wide servo range, and hardly suffers from a tracking error due to a disturbance can be realized. In addition, an optical head apparatus which is free from an electrical contact error between the preamplifier 220 and the flexible printed circuit 140 due to resonance of the rotary drum 105 can be realized.

In the embodiment of the optical head apparatus described above, in each radial magnetic circuit 120, the flat magnets 121 are arranged between two-end portions of the center and back yokes 123 and 124 to make the optical head apparatus compact. However, the present invention is not limited to this structure. As shown in FIG. 27, in each radial magnetic circuit 120, the permanent magnet 121 may be arranged in a gap between the center and back yokes 123 and 124, where the radial coil 114 is located, and may be fixed to the back yoke 124.

Additional advantages and modifications will readily occur to those skilled in the art. Therefore, the invention in its broader aspects is not limited to the specific details and representative devices or apparatuses shown and described herein. Accordingly, various modifications may be made without departing from the spirit or scope of the general inventive concept as defined by the appended claims and their equivalents.

What is claimed is:

1. An apparatus capable of moving an objective lens for focusing a light beam along an optical axis thereof, and moving said objective lens along a direction perpendicular to the optical axis, comprising:
   a holding member for holding said objective lens;
   first magnetic field generating means, provided to said holding member, for generating a first magnetic field;
   at least a pair of leaf springs, each having one end coupled to said holding member for supporting said holding member to be movable along the optical axis of said objective lens;
   a rotary body having a rotational axis at a center thereof, axially supported to be rotatable about the rotational axis, and including a substantially cylindrical first section to which the other end of each of said pair of leaf springs is fixed symmetrically about a first direction substantially perpendicular to the rotational axis, and a substantially triangular second section projecting from said first section in the first direction, said first and second sections constituting an integrated structure and having a symmetrical shape about the first direction;
   second magnetic field generating means, arranged on said rotary body, for generating a second magnetic field which interacts with the first magnetic field to generate a driving force for moving said holding member along the optical axis of said objective lens;
   third magnetic field generating means, arranged on said rotary body, for generating a third magnetic field; and
   fourth magnetic field generating means, arranged adjacent to said third magnetic field generating means, for generating a rotational force for rotating said rotary body about the rotational axis by an interaction with the third magnetic field generated by said third magnetic field generating means.

2. An apparatus according to claim 1, wherein said first magnetic field generating means includes an electromagnetic coil, and said second magnetic field generating means includes a permanent magnet and a yoke.

3. An apparatus according to claim 2, wherein said electromagnetic coil is fixed inside said holding member.

4. An apparatus according to claim 2, wherein said holding member has an optical path along which a light beam propagates toward said objective lens, and said electromagnetic coil is fixed to said holding member to be separated from the optical path.

5. An apparatus according to claim 1, wherein said third magnetic field generating means includes an electromagnetic coil, and said fourth magnetic field generating means includes a permanent magnet and a yoke.

6. An apparatus according to claim 1, wherein said rotary body includes a non-metal cup-like member having a hollow structure, an opening portion, an outer surface to which said third magnetic field generating means is fixed, and a relatively high thermal resistance, and a metal cover member having a relatively low thermal resistance and covering the opening portion of said cup member.

7. An apparatus according to claim 6, wherein said cup member is formed of a ceramic.

8. An apparatus according to claim 7, further comprising an optical member received in the cup member.

9. An apparatus according to claim 8, wherein the cup member has a hole which is covered by the optical member.

10. An apparatus according to claim 1, wherein said rotary body has a region corresponding to a node of a vibration mode generated in a resonance state, and the other end of each of said pair of leaf springs is substantially fixed to the region corresponding to the node of the vibration mode.

11. An apparatus according to claim 1, wherein said third magnetic field generating means has an outermost peripheral end which is rotated about the rotational axis together with said rotary body to have a radius L of rotation, and the other end of each said pair of leaf springs is fixed within a specific region of said rotary body, said region being defined as an annular region between a circle having a radius L/4 and a circle having a radius 3 L/4.

12. An apparatus according to claim 1, wherein said second and fourth magnetic field generating means generate magnetic fields which repel each other.

13. An apparatus according to claim 1, wherein said second magnetic field generating means includes a permanent magnet and a yoke, and said fourth magnetic field generating means includes a permanent magnet and a yoke, said permanent magnets of said second and fourth magnetic field generating means generating magnetic fields which repel each other when said second and fourth magnetic field generating means come close to each other.

14. An apparatus according to claim 1, further comprising:
    means for magnetically shielding said second and fourth magnetic field generating means.

15. An apparatus according to claim 1, further comprising:
    a magnetic member arranged between said second and fourth magnetic field generating means and formed of a magnetic material.

16. An apparatus according to claim 15, further comprising:
    a nonmagnetic member arranged between said fourth magnetic field generating means and said magnetic member, said magnetic member being fixed to said fourth magnetic field generating means through said nonmagnetic member.

17. An apparatus according to claim 1, further comprising:
    fifth magnetic field generating means, fixed on said rotary member to oppose said first magnetic field generating means through the rotational axis, for generating a fifth magnetic field which repels a fourth magnetic field generated by said fourth magnetic field generating means.

18. An apparatus according to claim 1, wherein said third magnetic field generating means includes a pair of electromagnetic coils arranged to be symmetrical about the first direction and fixed to said rotary body, and said fourth magnetic field generating means includes a pair of magnetic circuits arranged to be symmetrical about the first direction, each of said pair of magnetic circuits coupled to one of said pair of electromagnetic coils and including a first yoke and a second yoke, each yoke having two sections, each section having an inner end and an outer end, the inner end sections of each yoke being attached to one another, said first yoke of each of the pair of magnetic circuits of the fourth magnetic field generating means extending through the electromagnetic coil to which it is coupled, said second yoke of each of the pair of magnetic circuits of the fourth magnetic field generating means being opposed to the corresponding first yoke of the same magnetic circuit, permanent magnets being interposed between the end portions of opposing yokes.

19. An apparatus according to claim 1, wherein said third magnetic field generating means includes a pair of electromagnetic coils arranged to be symmetrical about the first direction and fixed to said rotary body, and said fourth magnetic field generating means includes a pair of magnetic circuits arranged to be symmetrical about the first direction, each of said pair of magnetic circuits coupled to one of the electromagnetic coils, each of said pair of magnetic circuits includes a first yoke and a second yoke, said first yoke having first and second segment sections, and two end portions, said first yoke extending through the corresponding coupled electromagnetic coil of said third magnetic field generating means while said two segment sections thereof are coupled to each other, and positioned along the path of movement of the corresponding electromagnetic coil, said second yoke having first and second segment sections, and two end portions, and arranged to oppose said first yoke through a gap while said two segment sections corresponding to said segment sections of said first yoke are coupled to each other, first and second permanent magnets interposed between the end portions of the yokes.

20. An apparatus according to claim 19, wherein a first recess is formed in the first segment section of said second yoke of each of the pair of magnetic circuits of the fourth magnetic field generating means, a projection to be fitted in said first recess is formed on the second segment section of each said second yoke, a second recess is formed in the first segment section of said first yoke of each of the pair of magnetic circuits of the fourth magnetic field generating means, and a projection to be fitted in said second recess is formed on the second segment section of each said second yoke.

21. An apparatus according to claim 1, further comprising:
    a base on which said fourth magnetic field generating means is arranged;
    a rotational shaft arranged on the rotational axis of said rotary body; and
    a bearing, fixed on said base, for axially and rotatably supporting said rotational shaft.

22. An apparatus according to claim 21, wherein said base is formed of a magnetic material, so that a fourth magnetic field generated by said fourth magnetic field generating means passes through said base.

23. An apparatus according to claim 1, further comprising:
    first and second members rotated in a moving path together with said rotary body, and arranged along said moving path to have a first gap therebetween;
    first and second detection units, arranged in said moving path to have a second gap therebetween, for detecting movement of said first and second members to generate first and second detection signals, respectively, when said rotary body is moved to a first position, said first member being detected by said first and second detection units, and when said rotary body is moved to a second position, said first and second members being detected said second detection units; and
    signal processing means for processing the first and second detection signals from said first and second detection units to generate a position signal corresponding to a moving position of said rotary member.

24. An apparatus according to claim 23, wherein each of said first and second detection units includes a light-emitting element for generating a second light beam, and a detection element, opposing said light-emitting element through a gap, for detecting the second light beam, and each of said first and second members includes a shutter passing through a gap in the corresponding detection unit.

25. An apparatus according to claim 23, wherein said signal processing means includes moving signal generating means for calculating a difference between the first and second detection signals and generating a moving signal for moving said rotary body to minimize the difference.

26. An apparatus for detecting movement of a moving body moved within a range between first and second positions, comprising:
first and second members moved in a moving path together with said moving body, and arranged along said moving path to have a first gap therebetween;
first and second detection units, separately arranged in said moving path, for detecting movement of said first and second members to generate first and second detection signals, respectively, when said moving body is moved to a first position, said first member being detected by said first and second detection units, and when said moving body is moved to a second position, said second member being detected by said first and second detection units; and
signal processing means for processing the first and second detection signals from said first and second detection units to generate a position signal corresponding to a moving position of said moving body.

27. An apparatus according to claim 26, wherein each of said first and second detection units includes a light-emitting element for generating a second light beam, and a detection element, opposing said light-emitting element through a gap, for detecting the second light beam, and each of said first and second members includes a shutter passing through a gap in the corresponding detection unit.

28. An apparatus according to claim 26, wherein said signal processing means includes moving signal generating means for calculating a difference between the first and second detection signals and generating a moving signal for moving said moving body to minimize the difference.

29. A rotary actuator comprising:
first magnetic field generating means for generating a first magnetic field;
second magnetic field generating means for generating a second magnetic field which interacts with the first magnetic field to generate a rotational force; and
a rotary body, which has a rotational axis at a center thereof, is axially supported to be rotatable about the rotational axis, and is rotated by the generated rotational force, said rotary body having a first moment of inertia about the central axis, which is equal to a second moment of inertia about a central axis of said second magnetic field generating means, and said second magnetic field generating means is fixed to said rotary body.

30. An actuator according to claim 29, wherein said first magnetic field generating means includes an electromagnetic coil, and said second magnetic field generating means includes a permanent magnet and a yoke.

31. An actuator according to claim 29, wherein said rotary member includes a non-metal cup-like cup member having a hollow structure, an opening portion, an outer surface to which said third magnetic field generating means is fixed, and a relatively high thermal resistance, and a metal cover member having a relatively low thermal resistance and covering the opening portion of said cup member.

32. An actuator according to claim 31, wherein said cup member is formed of a ceramic.

33. An apparatus capable of moving an objective lens for focusing a light beam along an optical axis thereof, and moving said objective lens along a direction perpendicular to the optical axis; said apparatus comprising:
a holding member for holding said objective lens;
first magnetic field generating means, provided on said holding member, for generating a first magnetic field;
at least one pair of leaf springs, each having one end coupled to said holding member, for supporting said holding member to be movable along the optical axis of said objective lens;
a rotary body having a central rotational axis, and axially supported to be rotatable about the rotational axis, and including a substantially cylindrical first section to which the other end of each of said at least one pair of leaf springs is fixed in symmetrical fashion in a first direction, substantially perpendicular to the rotational axis, and a substantially triangular second section projecting from said first section, in the first direction, said first and second sections constituting an integrated structure symmetrical in the first direction;
second magnetic field generating means, arranged on said rotary body, for generating a second magnetic field which interacts with the first magnetic field to generate a driving force for moving said holding member along the optical axis of said objective lens;
third magnetic field generating means, arranged on said rotary body, for generating a third magnetic field; and
fourth magnetic field generating means, arranged adjacent to said third magnetic field generating means, for generating a rotational force for rotating said rotary body about the rotational axis by interaction with the third magnetic field generated by said third magnetic field generating means; and
first and second stoppers, with which said rotary body is brought into contact, for regulating rotation of said rotary body to define a maximum rotational angle.

34. An apparatus according to claim 33, wherein said second section of said rotary body has first and second sides brought into contact with said first and second stoppers, respectively.

35. An apparatus according to claim 34, wherein said third magnetic field generating means includes a pair of electromagnetic coils fixed to said rotary body to be symmetrical about the first direction, said fourth magnetic field generating means includes a pair of permanent magnets arranged to be symmetrical about the first direction and yokes extending in said electromagnetic coils, said yokes having surfaces parallel to said first and second sides, which surfaces oppose said first and second sides of said rotary body when said rotary body is rotated at the maximum rotational angle, and on which surfaces said first and second stoppers are arranged.

36. An apparatus according to claim 33, wherein said first magnetic field generating means includes an electromagnetic coil, and said second magnetic field generating means includes a permanent magnet and a yoke.

37. An apparatus according to claim 36, wherein said electromagnetic coil is fixed inside said holding member.

38. An apparatus according to claim 36, wherein said holding member has an optical path along which a light beam propagates toward said objective lens, and said electromagnetic coil is fixed to said holding member to be separated from the optical path.

39. An apparatus according to claim 33, wherein said third magnetic field generating means includes an electromagnetic coil, and said fourth magnetic field generating means includes a permanent magnet and a yoke.

40. An apparatus according to claim 33, wherein said rotary member includes a non-metal cup-like member having a hollow structure, an opening portion, an outer surface to which said third magnetic field generating means is fixed, and a relatively high thermal resistance, and a metal cover member having a relatively low thermal resistance and covering the opening portion of said cup-like member.

41. An apparatus according to claim 40, wherein said cup-like member is formed of a ceramic material.

42. An apparatus according to claim 41, further comprising an optical member received in the cup-like member.

43. An apparatus according to claim 42, wherein the cup-like member has a hole which is covered by the optical member.

44. An apparatus according to claim 33, wherein said rotary body has a region corresponding to a node of a vibration mode generated in a resonance state, and the other end of each of said pair of leaf springs is substantially fixed to the region corresponding to the node of the vibration mode.

45. An apparatus according to claim 33, wherein said third magnetic field generating means has an outermost peripheral end which is rotated about the rotational axis of said rotary body together with said rotary body to have a radius L of rotation, and the other end of each of said at least one pair of leaf springs is fixed to said rotary body within a specific region of said rotary body, said region being defined as an annular region between a circle having a radius $L/4$ and a circle having a radius $3L/4$.

46. An apparatus according to claim 33, wherein said second and fourth magnetic field generating means generate magnetic fields which repel each other.

47. An apparatus according to claim 33, wherein said second magnetic field generating means includes a permanent magnet and a yoke, and said fourth magnetic field generating means includes a permanent magnet and a yoke, said permanent magnets of said second and fourth magnetic field generating means generating magnetic fields which repel each other when said second and fourth magnetic field generating means come in close proximity.

48. An apparatus according to claim 33, further comprising means for magnetically shielding said second and fourth magnetic field generating means.

49. An apparatus according to claim 33, further comprising a member arranged between said second and fourth magnetic field generating means and formed of a magnetic material.

50. An apparatus according to claim 49, further comprising a nonmagnetic member arranged between said fourth magnetic field generating means and said magnetic member, said magnetic member being fixed to said fourth magnetic field generating means through said nonmagnetic member.

51. An apparatus according to claim 33, further comprising fifth magnetic field generating means, fixed on said rotary member to oppose said first magnetic field generating means through the rotational axis, for generating a fifth magnetic field which repels a fourth magnetic field generated by said fourth magnetic field generating means.

52. An apparatus according to claim 33, wherein said third magnetic field generating means includes a pair of electromagnetic coils arranged in symmetrical fashion in the first direction and fixed to said rotary body, and said fourth magnetic field generating means includes a pair of magnetic circuits arranged in symmetrical fashion in the first direction, each of said pair of magnetic circuits including a first yoke which has a first end portion and a second end portion, is inserted in the corresponding electromagnetic coil of said third magnetic field generating means, and along which the corresponding electromagnetic coil is moved, second and third yokes each having a first end portion and a second end portion and arranged through a gap to oppose said first yoke, first and second permanent magnets interposed between the first end portions of said first yoke, and third and fourth permanent magnets interposed between the second end portions of said second and third yokes and the second end portion of said first yoke.

53. An apparatus according to claim 33, wherein:
said third magnetic field generating means includes a pair of electromagnetic coils arranged in symmetrical fashion in the first direction and fixed to said rotary body; and
said fourth magnetic field generating means includes a pair of magnetic circuits arranged in symmetrical fashion in the first direction, each of said pair of magnetic circuits includes;
a first yoke which has a first end portion and a second end portion, is inserted in the corresponding electromagnetic coil of said third magnetic field generating means, and along which the corresponding electromagnetic coil is moved,
a second yoke having a first end portion and a second end portion, and arranged to oppose said first yoke through a gap,
a third yoke having a first end portion and a second end portion and arranged to oppose said first yoke through a gap,
first and second permanent magnets interposed between the first end portions of said second and third yokes and the second end portion of said first yoke, and
third and fourth permanent magnets interposed between the second end portions of said second and third yokes and the second end portion of said first yoke.

54. An apparatus according to claim 53, wherein a recess is formed in one of coupled portions of said segment sections of said second yoke, a projection to be fitted in said recess is formed on the other coupled portion, a recess is formed in one of coupled portions of said segment sections of said third yoke, and a projection to be fitted in said recess is formed on the other coupled portion.

55. An apparatus according to claim 33, further comprising:
a base on which said fourth magnetic field generating means is arranged;
a rotational shaft situated on the rotational axis of said rotary body; and
a bearing, fixed on said base, for supporting said rotational shaft axially and rotatably.

56. An apparatus according to claim 55, wherein said base is formed of a magnetic material, to enable a fourth magnetic field generated by said fourth magnetic field generating means to pass through said base.

57. An apparatus according to claim 33, further comprising:
  detection means for detecting a light beam to generate a detection signal;
  and current supply means for transmitting the detection signal output from said detection means to an external device and causing said external device to supply a current to said first and third magnetic field generating means to energize said first and third magnetic field generating means.

58. An apparatus according to claim 57, wherein said current supply means includes a flexible printed circuit one end of which is fixed to said rotary body, and the other end of which is fixed to an external portion.

59. An apparatus according to claim 58, wherein said rotary body has a coupling projection, said detection means includes a circuit element having a recess to be fitted on said coupling projection, and said flexible printed circuit has a hole or a recess fitted on said coupling projection.

60. An apparatus according to claim 58, wherein said rotary body has a coupling hole or recess, said detection means includes a circuit element having a projection to be fitted in said coupling hole or recess, and said flexible printed circuit has a hole fitted on said projection of said detection means.

61. An apparatus according to claim 58, wherein said flexible printed circuit is arranged at a side opposite said objective lens with respect to the rotational axis.

62. An apparatus according to claim 61, wherein one end of said flexible printed circuit is fixed to said rotary body substantially on a line connecting the rotational axis and the optical axis of said objective lens.

63. An apparatus according to claim 33, further comprising:
  first and second members rotated in a moving path together with said rotary body, and arranged along said moving path having a first gap therebetween;
  first and second detection units, arranged in said moving path having a second gap therebetween, for detecting movement of said first and second members to generate first and second detection signals, respectively, when said rotary body is moved to a first position, movement of said first member being detected by said first and second detection units, and when said rotary body is moved to a second position, movement of said second member being detected by said second detection unit; and
  signal processing means for processing the first and second detection signals from said first and second detection units to generate a position signal corresponding to a moving position of said rotary member.

64. An apparatus according to claim 63, wherein each of said first and second detection units includes a light-emitting element for generating a second light beam, and a detection element, opposing said light-emitting element through a gap, for detecting the second light beam, and each of said first and second members includes a shutter passing through a gap in the corresponding detection unit.

65. An apparatus according to claim 63, wherein said signal processing means includes moving signal generating means for calculating a difference between the first and second detection signals and generating a moving signal for moving said rotary body to minimize the difference.

66. An apparatus capable of moving an objective lens for focusing a light beam along an optical axis thereof, and moving said objective lens along a direction perpendicular to the optical axis, said apparatus comprising:
  a holding member for holding said objective lens;
  first magnetic field generating means, provided on said holding member, for generating a first magnetic field;
  at least one pair of leaf springs, each having a first end coupled to said holding member and a second end, for supporting said holding member to be movable along the optical axis of said objective lens;
  a rotary body having a central rotational axis, and axially supported to be rotatable about the rotational axis, and including a substantially cylindrical first section to which the second end of each of said at least one pair of leaf springs is fixed in symmetrically fashion in a first direction, substantially perpendicular to the rotational axis, and a substantially triangular second section projecting from said first section, in the first direction, said first and second sections constituting an integrated structure symmetrical in the first direction;
  second magnetic field generating means, arranged on said rotary body, for generating a second magnetic field which interacts with the first magnetic field to generate a driving force for moving said holding member along the optical axis of said objective lens;
  third magnetic field generating means, arranged on said rotary body, for generating a third magnetic field;
  fourth magnetic field generating means, arranged adjacent to said third magnetic field generating means, for generating a rotational force for rotating said rotary body about the rotational axis by interaction with the third magnetic field generated by said third magnetic field generating means;
  detection means for detecting a light beam to generate a detection signal; and
  current supply means for transmitting the detection signal output from said detection means to an external control device and causing said external control device to supply a current to said first and third magnetic field generating means, to energize said first and third magnetic field generating means.

67. An apparatus according to claim 66, wherein said current supply means includes a flexible printed circuit one end of which is fixed to said rotary body, and the other end of which is fixed to an external portion.

68. An apparatus according to claim 67, wherein said rotary body has a coupling projection, said detection means includes a recess on said flexible circuit board fitting on said coupling projection, and said flexible printed circuit has a hole or a recess fitted on said coupling projection.

69. An apparatus according to claim 67, wherein said rotary body has a coupling hole or recess, said detection means includes a projection on said flexible circuit board fitting in said coupling hole or recess, and said flexible printed circuit has a hole fitted on said projection of said detection means.

70. An apparatus according to claim 67, wherein said flexible printed circuit is arranged at a side opposite to said objective lens with respect to the rotational axis.

71. An apparatus according to claim 70, wherein one end of said flexible printed circuit is fixed to said rotary body substantially on a line connecting the rotational axis and the optical axis of said objective lens.

72. An apparatus according to claim 66, wherein said first magnetic field generating means includes an electromagnetic coil, and said second magnetic field generating means includes a permanent magnet and a yoke.

73. An apparatus according to claim 72, wherein said electromagnetic coil is fixed inside said holding member.

74. An apparatus according to claim 72, wherein said holding member has an optical path along which a light beam propagates toward said objective lens, and said electromagnetic coil is fixed to said holding member to be separated from the optical path.

75. An apparatus according to claim 66, wherein said third magnetic field generating means includes an electromagnetic coil, and said fourth magnetic field generating means includes a permanent magnet and a yoke.

76. An apparatus according to claim 66, wherein said rotary member includes a non-metal cup-like member having a hollow structure, an opening portion, an outer surface to which said third magnetic field generating means is fixed, and a relatively high thermal resistance, and a metal cover member having a relatively low thermal resistance and covering the opening portion of said cup member.

77. An apparatus according to claim 76, wherein said cup-like member is formed of a ceramic material.

78. An apparatus according to claim 66, wherein said rotary body has a region corresponding to a node of a vibration mode generated in a resonance state and the second end of each of said pair of leaf springs is substantially fixed to the region corresponding to the node of the vibration mode.

79. An apparatus according to claim 66, wherein said third magnetic field generating means has an outermost peripheral end which is rotated about the rotational axis together with said rotary body to have a radius L of rotation, and the second end of each of said at least one pair of leaf springs is fixed within a specific region of said rotary body, said region being defined as an annular region between a circle having a radius L/4 and a circle having a radius 3L/4.

80. An apparatus according to claim 66, further comprising:
first and second stoppers, with which said rotary body is brought into contact, for regulating rotation of said rotary body to define a maximum rotation angle, wherein said second section of said rotary body has first and second sides brought into contact with said first and second stoppers, respectively.

81. An apparatus according to claim 80, wherein said third magnetic field generating means includes a pair of electromagnetic coils fixed to said rotary body in symmetrical fashion in the first direction, said fourth magnetic field generating means includes a pair of permanent magnets arranged in symmetrical fashion in the first direction and yokes extending in said electromagnetic coils, said yokes having surfaces parallel to said first and second sides, which surfaces oppose said first and second sides when said rotary body is rotated at the maximum rotational angle, and on which surfaces said first and second stoppers are arranged.

82. An apparatus according to claim 66, wherein said second and fourth magnetic field generating means generate magnetic fields which repel each other.

83. An apparatus according to claim 66, wherein said second magnetic field generating means includes a permanent magnet and a yoke, and said fourth magnetic field generating means includes a permanent magnet and a yoke, said permanent magnets of said second and fourth magnetic field generating means generating magnetic fields which repel each other when said second and fourth magnetic field generating means come in close proximity.

84. An apparatus according to claim 66, further comprising means for magnetically shielding said second and fourth magnetic field generating means.

85. An apparatus according to claim 66, further comprising a member arranged between said second and fourth magnetic field generating means and formed of a magnetic material.

86. An apparatus according to claim 85, further comprising a nonmagnetic member arranged between said fourth magnetic field generating means and said magnetic member, said magnetic member being fixed to said fourth magnetic field generating means through said nonmagnetic member.

87. An apparatus according to claim 66, further comprising fifth magnetic field generating means, fixed on said rotary member to oppose said first magnetic field generating means through the rotational axis, for generating a fifth magnetic field which repels a fourth magnetic field generated by said fourth magnetic field generating means.

88. An apparatus according to claim 66, wherein said third magnetic field generating means includes a pair of electromagnetic coils arranged in symmetrical fashion in the first direction and fixed to said rotary body, and said fourth magnetic field generating means includes a pair of magnetic circuits arranged in symmetrical fashion in the first direction, each of said electromagnetic coils being coupled to a corresponding one of said pair of magnetic circuits, each of said pair of magnetic circuits including a first yoke which has a first end portion and a second end portion, is inserted in the corresponding electromagnetic coil of said third magnetic field generating means, and along which the corresponding electromagnetic coil is moved, second and third yokes each having a first end portion and a second end portion and arranged through a gap to oppose said first yoke, first and second permanent magnets interposed between the first end portions of said second and third yokes and the first end portion of said first yoke, and third and fourth permanent magnets interposed between the second end portions of said second and third yokes and the second end portion of said first yoke.

89. An apparatus according to claim 66, wherein:
said third magnetic field generating means includes a pair of electromagnetic coils arranged in symmetrical fashion in the first direction and fixed to said rotary body, and said fourth magnetic field generating means includes a pair of magnetic circuits arranged in symmetrical fashion in the first direction, each of said pair of magnetic circuits being coupled to a corresponding one of said pair of electromagnetic coils, each of said pair of magnetic circuit includes;

a first yoke which has a first end portion and a second end portion, is inserted in the corresponding electromagnetic coil of said third magnetic field generating means, and along which the corresponding electromagnetic coil is moved, a second yoke having a first end portion and a second end portion and arranged to oppose said first yoke through a gap, a third yoke having a first end portion and a second end portion and arranged to oppose said first yoke through a gap, first and second permanent magnets interposed between the first end portions of said second and third yokes and the first end portion of said first yoke, and third and fourth permanent magnets interposed between the second end portions of said second and third yokes and the second end portion of said first yoke.

90. An apparatus according to claim 89, wherein a recess is formed in one of coupled portions of said segment sections of said second yoke, a projection to be fitted in said recess is formed on the other coupled portion, a recess is formed in one of coupled portions of said segment sections of said third yoke, and a projection to be fitted in said recess is formed on the other coupled portion.

91. An apparatus according to claim 66, further comprising:

a base on which said fourth magnetic field generating means is arranged;

a rotational shaft arranged on the rotational axis of said rotary body; and a bearing, fixed on said base, for axially and rotatably supporting said rotational shaft.

92. An apparatus according to claim 91, wherein said base is formed of a magnetic material, to enable the fourth magnetic field generated by said fourth magnetic field generating means to pass through said base.

93. An apparatus according to claim 66, further comprising:

first and second members rotated in a moving path together with said rotary body, and arranged along said moving path having a first gap therebetween;

first and second detection units, arranged on said moving path having a second gap therebetween, for detecting movement of said first and second members to generate first and second detection signals, respectively, when said rotary body is moved to a first position, movement of said first member being detected by said first and second detection units, and when said rotary body is moved to a second position, movement of said second member being detected by said second detection unit; and signal processing means for processing the first and second detection signals from said first and second detection units, to generate a position signal corresponding to a moving position of said rotary member.

94. An apparatus according to claim 93, wherein each of said first and second detection units includes a light-emitting element for generating a second light beam, and a detection element, opposing said light-emitting element through a gap, for detecting the second light beam, and each of said first and second members includes a shutter passing through a gap in the corresponding detection unit.

95. An apparatus according to claim 93, wherein said signal processing means includes moving signal generating means for calculating a difference between the first and second detection signals and generating a moving signal for moving said rotary body, to minimize the difference.

* * * * *